US012783621B2

(12) United States Patent
Derakhshani et al.

(10) Patent No.: US 12,783,621 B2
(45) Date of Patent: Nov. 3, 2026

(54) BIOMETRIC AUTHENTICATION USING HEAD-MOUNTED DEVICES

(71) Applicant: Jumio Corporation, Palo Alto, CA (US)

(72) Inventors: Reza R. Derakhshani, Shawnee, KS (US); Yash Joshi, Kansas City, MO (US); Vikas Gottemukkula, Alexandria, VA (US)

(73) Assignee: Jumio Corporation, Sunnyvale, CA (US)

(*) Notice: Subject to any disclaimer, the term of this patent is extended or adjusted under 35 U.S.C. 154(b) by 230 days.

(21) Appl. No.: 18/148,484

(22) Filed: Dec. 30, 2022

(65) Prior Publication Data

US 2023/0222197 A1 Jul. 13, 2023

Related U.S. Application Data

(60) Provisional application No. 63/297,636, filed on Jan. 7, 2022.

(51) Int. Cl.

*G06F 21/32* (2013.01)
*G02B 27/01* (2006.01)
(Continued)

(52) U.S. Cl.

CPC ......... *G06F 21/32* (2013.01); *G02B 27/0172* (2013.01); *G06T 3/147* (2024.01);
(Continued)

(58) Field of Classification Search

None
See application file for complete search history.

(56) References Cited

U.S. PATENT DOCUMENTS 5,110,200 A * 5/1992 Snook .................... A61B 3/107 351/212
5,632,282 A * 5/1997 Hay ....................... G16H 15/00 600/558
(Continued)

FOREIGN PATENT DOCUMENTS

CN 110889356 A 3/2020
EP 3748576 A1 * 12/2020 ......... G06K 9/00221
(Continued)

OTHER PUBLICATIONS

Hiley et al "A Low Cost Human Computer Interface Based on Eye Tracking," IEEE, pp. 3226-3229 (Year: 2006).*
(Continued)

*Primary Examiner* — Luu T Pham
*Assistant Examiner* — James J Wilcox
(74) *Attorney, Agent, or Firm* — Patent Law Works, LLP

(57) ABSTRACT

A head-mounted wearable device includes a frame mountable on a head of a user; an infrared imaging device arranged to image a face of the user when the frame is mounted on the head of the user; and a computing system configured to perform operations including causing the infrared imaging device to capture an image of the face of the user using infrared light received at the infrared camera and initiating a biometric authentication process based on the image. The head-mounted wearable device may include a visible-light imaging device to image the face of the user with the computing system configured to perform operations including causing the visible-light imaging device to capture a second image of the face of the user using visible light received at the visible-light imaging device, with the biometric authentication process being based in part on the second image.

20 Claims, 15 Drawing Sheets

(51) Int. Cl.

| | |
|---|---|
| ***G06T 3/147*** | (2024.01) |
| ***G06T 7/60*** | (2017.01) |
| ***G06V 10/74*** | (2022.01) |
| ***G06V 20/64*** | (2022.01) |
| ***G06V 40/14*** | (2022.01) |
| ***G06V 40/16*** | (2022.01) |
| ***G06V 40/18*** | (2022.01) |
| ***H04N 23/11*** | (2023.01) |
| *G06V 20/20* | (2022.01) |

(52) U.S. Cl.

CPC .............. *G06T 7/60* (2013.01); *G06V 10/761* (2022.01); *G06V 20/653* (2022.01); *G06V 40/14* (2022.01); *G06V 40/171* (2022.01); *G06V 40/172* (2022.01); *G06V 40/193* (2022.01); *G06V 40/197* (2022.01); *H04N 23/11* (2023.01); *G06T 2207/30088* (2013.01); *G06T 2207/30201* (2013.01); *G06V 20/20* (2022.01)

(56) References Cited

U.S. PATENT DOCUMENTS 6,033,437 A * 3/2000 Perry ...................... A61F 2/141 623/905
6,218,423 B1 * 4/2001 Ross ...................... A61P 39/06 514/427
6,312,393 B1 * 11/2001 Abreu .................. A61B 5/1455 600/558
6,333,340 B1 * 12/2001 Ross ...................... A61P 27/02 514/318
6,337,340 B1 * 1/2002 Ross ...................... A61P 27/02 514/330
6,339,101 B1 * 1/2002 Ross ...................... A61P 27/10 514/330
6,376,517 B1 * 4/2002 Ross ...................... A61P 25/28 514/318
6,381,339 B1 * 4/2002 Brown ................... G06V 40/19 382/103
6,399,648 B1 * 6/2002 Ross ...................... A61P 27/02 514/423
6,506,788 B1 * 1/2003 Ross ...................... A61P 27/00 546/183
7,265,150 B1 * 9/2007 Ross .................. A61K 31/4545 548/533
7,986,816 B1 * 7/2011 Hoanca .................. G06V 40/18 382/280
8,163,896 B1 * 4/2012 Bentwich ........... C07K 14/4702 536/23.1
8,207,316 B1 * 6/2012 Bentwich ........... C12N 15/1131 435/375
8,664,362 B2 * 3/2014 Bansal .................... A61P 43/00 530/387.9
8,928,558 B2 * 1/2015 Lewis .................... G02B 30/34 345/9
9,025,252 B2 * 5/2015 Lewis .................. H04N 13/344 359/13
9,202,443 B2 * 12/2015 Perez ................. G02B 27/0172
9,213,163 B2 * 12/2015 Lewis .................... A61B 3/113
9,745,367 B2 * 8/2017 Bansal ................. G01N 33/566
9,939,893 B2 * 4/2018 Saripalle ................. G06F 3/013
9,961,204 B1 * 5/2018 Moran ............. G06Q 10/06393
9,965,860 B2 * 5/2018 Nguyen .................... G06T 7/20
10,063,560 B2 * 8/2018 Gordon ................. H04L 63/102
10,074,031 B2 * 9/2018 Krenzer .................... G06T 3/60
10,192,109 B2 * 1/2019 Skogö .................... G06V 40/19
10,275,024 B1 * 4/2019 Simmons ................ G06F 3/013
10,303,866 B1 * 5/2019 Van Os ................ G06V 40/171
10,303,869 B1 * 5/2019 Duke ...................... G06F 21/36
10,331,207 B1 * 6/2019 Simmons ............. H04N 13/383
10,417,495 B1 * 9/2019 Davami ................. G06V 40/19
10,445,574 B2 * 10/2019 Odinokikh ........... G06V 40/197
10,452,936 B2 * 10/2019 Mapen ................. G06V 40/193
10,599,934 B1 * 3/2020 Lowe ....................... G06T 7/248
10,698,990 B2 * 6/2020 Tsou ...................... G06V 40/70
10,699,116 B2 * 6/2020 Azam .................... G06V 40/19
10,733,275 B1 * 8/2020 Knas ...................... G06V 40/18
10,769,433 B2 * 9/2020 Nowak ................... G06F 21/32
10,773,083 B2 * 9/2020 Greenberg ......... A61N 1/36046
10,891,507 B2 * 1/2021 Huang .................... G06T 7/246
10,893,043 B1 * 1/2021 John ................... H04L 63/0492
10,908,422 B2 * 2/2021 Border ............... G02B 27/0172
10,928,904 B1 * 2/2021 Novelli ................... G06F 3/013
10,956,544 B1 * 3/2021 Knas .................... G06V 40/172
10,986,087 B2 * 4/2021 Watson ................... G06F 3/017
11,039,651 B1 * 6/2021 Bosworth ............... H04S 7/303
11,042,649 B1 * 6/2021 John .................... G06V 40/171
11,128,636 B1 * 9/2021 Jorasch ................. G06F 3/0346
11,132,543 B2 * 9/2021 Ranjan ................. G06N 3/0464
11,181,740 B1 * 11/2021 Lewis ................ G02B 27/0018
11,227,060 B1 * 1/2022 John ..................... G06F 21/606
11,294,203 B2 * 4/2022 Lewis ................ G02B 27/0093
11,322,113 B2 * 5/2022 Novelli ..................... G06T 7/70
11,367,194 B1 * 6/2022 Poliakov ................... G06T 7/66
11,416,072 B1 * 8/2022 Singh .................. G06F 3/04842
11,435,820 B1 * 9/2022 Hirsh .................... G06F 3/0346
11,458,040 B2 * 10/2022 Fix ......................... A61B 3/107
11,503,998 B1 * 11/2022 De Villers-Sidani ........................ A61B 5/4064
11,568,562 B1 * 1/2023 D'Amico ................ G06F 3/014
11,672,418 B2 * 6/2023 Hamrah ................. A61B 3/102 424/427
11,678,142 B1 * 6/2023 Taylor ..................... H04W 4/02 455/456.1
11,721,303 B2 * 8/2023 Haddick ............ G02B 27/0172 345/589
11,762,966 B2 * 9/2023 Gupta ..................... G06F 21/32 713/186
11,861,941 B1 * 1/2024 Molner .................. G06V 40/18
11,966,048 B1 * 4/2024 Oudenhoven ...... G02B 27/0172
12,002,068 B2 * 6/2024 Chintakindi ....... G06Q 30/0222
12,061,680 B1 * 8/2024 Hafeneger .............. G06F 21/32
12,079,993 B1 * 9/2024 Lochner ................. G16H 30/40
12,254,406 B2 * 3/2025 Guleryuz ................. G06N 3/08
12,505,698 B2 * 12/2025 Liljestrand ............ G06V 40/18
2002/0049389 A1 * 4/2002 Abreu .................. A61B 3/0058 600/318
2002/0135618 A1 * 9/2002 Maes ...................... G10L 15/24 715/767
2003/0009156 A1 * 1/2003 Levine ................... A61B 3/103 606/5
2004/0057013 A1 * 3/2004 Cappo .................... A61B 3/024 351/224
2005/0047629 A1 * 3/2005 Farrell .................... G06F 3/013 382/116
2005/0110949 A1 * 5/2005 Goldfain ................ A61B 3/158 351/206
2006/0206724 A1 * 9/2006 Schaufele ............... G06F 21/32 726/16
2006/0250218 A1 * 11/2006 Kondo ................... G06V 40/18 340/5.82
2007/0077553 A1 * 4/2007 Bentwich ............... C12Q 1/703 435/5
2008/0069408 A1 * 3/2008 Cervantes .......... G06V 40/1365 382/115
2010/0045596 A1 * 2/2010 De Leon ................. G06F 3/013 345/157
2010/0118267 A1 * 5/2010 Helfman ............... G06T 11/206 351/209
2010/0149073 A1 * 6/2010 Chaum .............. G02B 27/0075 345/8
2010/0205667 A1 * 8/2010 Anderson ............... G06F 3/013 726/19
2011/0063077 A1 * 3/2011 Jung .................. G06V 40/1324 340/5.83
2012/0105490 A1 * 5/2012 Pasquero ................. G09G 5/10 345/204
2012/0109923 A1 * 5/2012 Pasquero .............. G06F 16/904 707/706

(56) References Cited

U.S. PATENT DOCUMENTS

2012/0156202 A1* 6/2012 Shantha ............... C07K 16/241
424/134.1
2013/0010259 A1* 1/2013 Carnevale .............. A61B 3/102
351/209
2013/0158778 A1* 6/2013 Tengler .................. G06V 40/28
701/31.5
2013/0293468 A1* 11/2013 Perez ...................... G06F 3/033
345/158
2013/0336547 A1* 12/2013 Komogortsev ........ A61B 5/163
382/117
2014/0152792 A1* 6/2014 Krueger ............... A61B 5/4863
348/78
2014/0267010 A1* 9/2014 Pasquero .............. G06T 19/006
345/156
2014/0313485 A1* 10/2014 Umekawa .............. A61B 3/152
351/246
2014/0333415 A1* 11/2014 Kursun .................. G06Q 30/00
340/5.83
2014/0337634 A1* 11/2014 Starner ................. H04W 12/33
713/186
2014/0351896 A1* 11/2014 Koo .................... G06F 21/6209
726/4
2015/0113454 A1* 4/2015 McLaughlin ...... G06Q 30/0251
715/765
2015/0287206 A1* 10/2015 Ebisawa ................. G06T 7/593
382/154
2015/0302252 A1* 10/2015 Herrera .................. G06V 40/70
382/117
2015/0326570 A1* 11/2015 Publicover .......... H04W 12/065
382/117
2016/0014121 A1* 1/2016 Perna ................... G06V 40/193
726/4
2016/0063235 A1* 3/2016 Tussy ..................... G06V 40/70
726/6
2016/0063303 A1* 3/2016 Cheung ................ G06V 40/193
382/103
2016/0063314 A1* 3/2016 Samet ..................... G06F 21/31
348/78
2016/0083469 A1* 3/2016 Rohrer ................... A61K 45/06
424/9.1
2016/0206207 A1* 7/2016 Avila ................... A61B 5/4504
2016/0342782 A1 11/2016 Mullins
2017/0039869 A1* 2/2017 Gleim ...................... G09B 5/12
2017/0070680 A1* 3/2017 Kobayashi ............. H04N 23/63
2017/0119298 A1* 5/2017 Cheung ................ G06V 40/193
2017/0135577 A1* 5/2017 Komogortsev ........ A61B 5/168
2017/0140222 A1* 5/2017 Zhou ...................... G06V 40/20
2017/0186236 A1* 6/2017 Kawamoto ............. G06F 21/36
2017/0206411 A1* 7/2017 Abe ..................... G06V 40/193
2017/0209549 A1* 7/2017 Holers .................... A61P 29/00
2017/0235931 A1* 8/2017 Publicover ......... G02B 27/0172
2017/0251366 A1* 8/2017 Perna ...................... G06F 21/32
2017/0278269 A1* 9/2017 Ebisawa ................ G06V 40/19
2017/0300686 A1* 10/2017 Shyu ....................... G06F 21/36
2017/0346817 A1* 11/2017 Gordon .................. G06V 40/10
2017/0364732 A1* 12/2017 Komogortsev ......... G06T 7/248
2018/0042475 A1* 2/2018 Giardini ................... A61B 3/12
2018/0052324 A1* 2/2018 Shibukawa ............ G16H 10/60
2018/0060683 A1* 3/2018 Kontsevich ............ H04N 23/64
2018/0064336 A1* 3/2018 Kano ........................ G06T 7/11
2018/0084232 A1* 3/2018 Belenkii .............. H04N 9/3105
2018/0096119 A1 4/2018 Yun
2018/0107814 A1* 4/2018 Wu ........................ G06F 3/013
2018/0107815 A1* 4/2018 Wu ........................ G10L 17/00
2018/0107816 A1* 4/2018 Wu ........................ G06F 3/012
2018/0173951 A1* 6/2018 Andorko ................... G06T 7/11
2018/0181737 A1* 6/2018 Tussy ...................... G06F 21/32
2018/0197624 A1* 7/2018 Robaina ................. A61B 90/37
2018/0219950 A1* 8/2018 Hodge ................ H04L 63/0861
2018/0224935 A1* 8/2018 Thunström ............. G06F 3/013
2018/0260643 A1* 9/2018 Sheikh Faridul ...... G06V 40/45
2018/0276467 A1* 9/2018 Kaehler ............... G02B 27/017
2018/0321744 A1* 11/2018 Cheaz ..................... G06F 3/011
2018/0335840 A1* 11/2018 Lin ......................... G06F 3/013
2018/0365490 A1* 12/2018 Agrawal .............. G06V 40/193
2018/0375660 A1* 12/2018 Yildiz ..................... H04W 4/80
2019/0019141 A1* 1/2019 Torii ..................... H04W 12/06
2019/0034606 A1* 1/2019 Mapen .................... G06F 21/36
2019/0065875 A1* 2/2019 Sheikh Faridul ...... G06V 40/40
2019/0130082 A1* 5/2019 Alameh .............. G06F 21/6218
2019/0130622 A1* 5/2019 Hoover ................... G06F 3/012
2019/0150727 A1* 5/2019 Blaha .................. A61B 3/0091
2019/0156100 A1* 5/2019 Rougeaux ............ G06V 40/161
2019/0156715 A1* 5/2019 James ..................... G06F 3/017
2019/0179409 A1* 6/2019 Jones ................. G02B 27/0172
2019/0213311 A1* 7/2019 Tussy ..................... G06V 40/70
2019/0213312 A1* 7/2019 Tussy ..................... G06V 40/70
2019/0216857 A1* 7/2019 Pena ...................... A61K 38/00
2019/0222830 A1* 7/2019 Edwin ................ G02B 27/0081
2019/0243448 A1* 8/2019 Miller .................... A61B 3/113
2019/0244005 A1* 8/2019 Suzuki ................. G06V 40/193
2019/0250408 A1* 8/2019 Lafon ................. G02B 27/017
2019/0250413 A1* 8/2019 Martin ................... G02C 7/049
2019/0259174 A1* 8/2019 De Villers-Sidani ........................
G06V 40/171
2019/0274565 A1* 9/2019 Soli .................... A61B 5/02438
2019/0278089 A1* 9/2019 Son ........................ G02B 27/01
2019/0278354 A1* 9/2019 Alameh .................. G06F 3/013
2019/0286229 A1* 9/2019 Chen ....................... G06F 3/013
2019/0311102 A1* 10/2019 Tussy ..................... G06V 40/67
2019/0318435 A1* 10/2019 De La Cruz ........... G06Q 50/18
2019/0324531 A1* 10/2019 Eraslan ................... G06F 21/32
2019/0325633 A1* 10/2019 Miller, IV ............. G06V 40/18
2019/0332758 A1* 10/2019 Yin ......................... G06F 3/013
2019/0339528 A1* 11/2019 Freeman ................ G09G 3/002
2019/0340817 A1* 11/2019 Bostick ............... G06F 3/04815
2019/0347391 A1* 11/2019 Kim ........................ G06F 21/32
2019/0370448 A1* 12/2019 Devine ................... G06F 21/32
2019/0387168 A1* 12/2019 Smith ..................... G06T 7/246
2019/0392145 A1* 12/2019 Komogortsev ......... G06F 21/32
2019/0392163 A1* 12/2019 Lake ..................... G06F 3/1454
2019/0392643 A1* 12/2019 Busto ...................... G06T 17/20
2020/0019688 A1* 1/2020 Jhawar .................... G10L 17/24
2020/0026272 A1* 1/2020 Castet .................. G05D 1/0016
2020/0027275 A1* 1/2020 Wan ........................ G06F 3/016
2020/0042685 A1* 2/2020 Tussy ..................... G06V 40/50
2020/0043236 A1* 2/2020 Miller ................ G02B 27/0172
2020/0050745 A1* 2/2020 Kim ........................ G06F 21/32
2020/0073143 A1* 3/2020 Macnamara ............. A61B 3/14
2020/0089851 A1* 3/2020 Kumar Agrawal .... G06V 20/52
2020/0093362 A1* 3/2020 Jackson ................. A61B 3/063
2020/0098173 A1* 3/2020 McCall .............. G02B 27/0172
2020/0101318 A1* 4/2020 Marsteller ........... A61F 9/00781
2020/0110862 A1* 4/2020 Derakhshani ........... G06F 21/32
2020/0111255 A1* 4/2020 Brodsky .............. G02B 27/017
2020/0125832 A1* 4/2020 Zhang ..................... G06T 7/557
2020/0125834 A1* 4/2020 Zhou ...................... G06V 40/19
2020/0160345 A1* 5/2020 Damania ................ G06V 40/70
2020/0162719 A1* 5/2020 Tadi ..................... H04N 13/271
2020/0183490 A1* 6/2020 Klingström ............... G06T 7/73
2020/0193131 A1* 6/2020 Wang ..................... G06V 40/19
2020/0197725 A1* 6/2020 Marsteller ............. A61N 5/103
2020/0228524 A1* 7/2020 Szafranski ............. A63F 13/79
2020/0229969 A1* 7/2020 Fix ....................... A61B 3/0008
2020/0233493 A1* 7/2020 Bott ..................... G06V 40/161
2020/0241635 A1* 7/2020 Cohen .................... G06V 40/19
2020/0250284 A1* 8/2020 Diehl ..................... G06V 40/20
2020/0257113 A1* 8/2020 Bednarik ............... A61B 3/113
2020/0257358 A1* 8/2020 Rosell .................... G06V 10/44
2020/0257403 A1* 8/2020 Sepulveda .............. G06F 21/31
2020/0258255 A1* 8/2020 Aleem .................... G06T 7/536
2020/0292825 A1* 9/2020 Grundhoefer ........ G02B 27/017
2020/0320205 A1* 10/2020 Engel .................. G06F 3/04842
2020/0320282 A1* 10/2020 Boic ...................... G06V 40/45
2020/0334347 A1* 10/2020 Hoyos ................. H04L 63/0861
2020/0342086 A1* 10/2020 Oung ................. H04W 12/065
2020/0353868 A1* 11/2020 Schut ........................ B60R 1/04
2020/0364441 A1* 11/2020 O'Sullivan .......... G06V 40/193
2020/0364453 A1* 11/2020 Tonsen ................... G06V 40/19
2020/0366671 A1* 11/2020 Larson .................... G06F 9/451
2020/0372678 A1* 11/2020 Farmer ................... G06F 3/013
2020/0400944 A1* 12/2020 Burnsed ................. H04N 23/11

(56) References Cited

U.S. PATENT DOCUMENTS

2021/0011606 A1* 1/2021 Brown, IV ............. G06F 1/163
2021/0012105 A1* 1/2021 Masko .................... G06T 7/277
2021/0019540 A1* 1/2021 Nilsson ................ G06V 10/147
2021/0035343 A1* 2/2021 Yoshida .................. G06T 11/60
2021/0041701 A1* 2/2021 Kassner ................... G02C 9/04
2021/0048967 A1* 2/2021 Bernstein .............. G06F 3/1423
2021/0072824 A1* 3/2021 Wiemer ............... G06V 40/172
2021/0073362 A1* 3/2021 Alameh .................. G06F 21/44
2021/0080321 A1* 3/2021 Kaehler ................ G01J 3/0262
2021/0081952 A1* 3/2021 Rakshit ................ G06Q 20/405
2021/0093192 A1* 4/2021 Gründig ................. A61B 3/102
2021/0093193 A1* 4/2021 Birkner .................... A61B 3/12
2021/0097644 A1* 4/2021 Sommerlade ............. G06T 5/73
2021/0104100 A1* 4/2021 Whitney ................. G06T 13/40
2021/0150818 A1* 5/2021 Dedonato ............... G06F 3/011
2021/0157400 A1* 5/2021 Funatsu ............... G06V 40/171
2021/0166459 A1* 6/2021 Miller, IV ............. G06F 1/1637
2021/0173206 A1* 6/2021 Das .................. G02B 27/0093
2021/0181514 A1* 6/2021 Martin ............... G02B 27/0093
2021/0181840 A1* 6/2021 Vlaskamp .......... G02B 27/0093
2021/0182553 A1* 6/2021 Lv .......................... G06F 3/013
2021/0192351 A1* 6/2021 Zakariaie ........... G06Q 10/0635
2021/0197665 A1* 7/2021 Won ........................ G06F 3/011
2021/0201021 A1* 7/2021 Novelli .................. G06T 7/246
2021/0203506 A1* 7/2021 Edwards ............... H04L 9/0819
2021/0209389 A1* 7/2021 Hoang .................... G06F 21/45
2021/0223858 A1* 7/2021 Barak ..................... G06F 1/163
2021/0223859 A1* 7/2021 Sun ...................... G06V 10/764
2021/0256259 A1* 8/2021 Pedroza ................. G06V 20/20
2021/0258484 A1* 8/2021 Kato ...................... H04N 23/61
2021/0263307 A1* 8/2021 Rotariu .................. G06V 40/19
2021/0294106 A1* 9/2021 Meitav ............... G02B 27/0093
2021/0294883 A1* 9/2021 Kim ....................... G06V 40/18
2021/0304291 A1* 9/2021 Aggarwal .......... G06Q 30/0633
2021/0312684 A1* 10/2021 Zimmermann ..... A63F 13/5255
2021/0318558 A1* 10/2021 Tzvieli ............... G02B 27/0093
2021/0335085 A1* 10/2021 Froy, Jr. ................ A63F 13/428
2021/0335086 A1* 10/2021 Idris .......................... G06T 7/70
2021/0341742 A1* 11/2021 Edwin ................ G02B 27/0172
2021/0342020 A1* 11/2021 Jorasch ................... G06F 3/011
2021/0350769 A1* 11/2021 Lee .......................... G09G 5/37
2021/0357027 A1* 11/2021 Yamasaki .............. H04N 23/60
2021/0365533 A1* 11/2021 Kaplan .................... G06N 3/08
2021/0382970 A1* 12/2021 Odinokikh ............. G06N 3/045
2021/0397253 A1* 12/2021 Kocdemir .......... G02B 27/0093
2022/0004617 A1* 1/2022 Irwin, III ................ G06F 21/40
2022/0011578 A1* 1/2022 Sinay ................. G02B 27/0172
2022/0012459 A1* 1/2022 Schwiegerling ....... G06V 40/19
2022/0035161 A1* 2/2022 Sinay ................. G02B 27/0172
2022/0057519 A1* 2/2022 Goldstein ............... G01S 17/88
2022/0066549 A1* 3/2022 Bhat .................... G02B 27/017
2022/0070167 A1* 3/2022 Adams, Jr. .............. G06F 21/30
2022/0099977 A1* 3/2022 Meitav ............... G02B 27/0093
2022/0100268 A1* 3/2022 Weinberg ............... G06N 20/00
2022/0114248 A1* 4/2022 Barros .................... G06F 21/44
2022/0121884 A1* 4/2022 Zadeh .................... G06N 3/006
2022/0137703 A1* 5/2022 Miller ....................... G06T 7/73
345/633
2022/0146819 A1* 5/2022 Boyle ................ G02B 27/0093
2022/0148218 A1* 5/2022 Weitz ................... A61B 5/0077
2022/0171453 A1* 6/2022 Powderly ........... G02B 27/0172
2022/0180532 A1* 6/2022 Zachrisson .............. G02B 3/08
2022/0197376 A1* 6/2022 Boyle ................ G02B 27/0093
2022/0206571 A1* 6/2022 Drozdov .............. G06V 40/161
2022/0215079 A1* 7/2022 Balliu ....................... G06T 7/50
2022/0222971 A1* 7/2022 Akiyama ................ G06F 21/84
2022/0229895 A1* 7/2022 Ranjan .................... G06F 21/35
2022/0253135 A1* 8/2022 Cohen .................. G02B 27/017
2022/0261485 A1* 8/2022 Shirai ................... G06F 21/602
2022/0300073 A1* 9/2022 Reshidko ............... G06V 40/19
2022/0345619 A1* 10/2022 Kato ...................... G06V 20/52
2022/0351469 A1* 11/2022 Pan ....................... G06T 19/006
2022/0388543 A1* 12/2022 David ............. B60W 30/18163
2022/0390771 A1* 12/2022 David .................... G06V 40/16
2023/0010712 A1* 1/2023 Marsteller ............ A61N 5/1028
2023/0045580 A1* 2/2023 Weinberg ................ G06F 3/013
2023/0144782 A1* 5/2023 Wu .......................... A61B 3/18
351/206
2023/0168735 A1* 6/2023 Chugh .................... G06F 3/012
382/103
2023/0177128 A1* 6/2023 Vankipuram ........... G06F 3/011
713/186
2023/0185369 A1* 6/2023 Russell .............. G02B 27/0172
345/156
2023/0210365 A1* 7/2023 Chan ....................... G06F 3/013
345/8
2023/0334909 A1* 10/2023 Haller .................. G06V 10/143
2023/0367857 A1* 11/2023 Haller .................. G06V 40/197
2023/0377302 A1* 11/2023 Haller .................. G06V 10/141
2023/0377370 A1* 11/2023 Haller .................. G06V 10/993
2023/0379564 A1* 11/2023 Haller .................... G06V 40/40
2023/0393398 A1* 12/2023 Oh ..................... G02B 27/0172
2024/0054194 A1* 2/2024 Oami ..................... G06V 10/25

FOREIGN PATENT DOCUMENTS

JP 2015504616 A * 2/2015 ............. G06F 3/167
WO WO-2006034135 A2 * 3/2006 ............... G06K 9/00
WO 2015039102 A1 3/2015
WO 2020259127 A1 12/2020

OTHER PUBLICATIONS

Boehnen et al "A Standoff Multimodal Biometric System," IEEE, pp. 1-4 (Year: 2011).*

Magee et al "A Human-Computer Interface Using Symmetry Between Eyes to Detect Gaze Direction," IEEE, pp. 1248-1261, (Year: 2008).*

Suganya et al "A New Biometric Using Sclera Vein Recognition for Human Identification," IEEE, pp. 1-4 (Year: 2014).*

Guliani et al "Analysis of Multimodal Biometric Recognition Using Iris & Sclera" IEEE, pp. 1-4 (Year: 2017).*

Joo et al "OSTGazeNet: One-State Trainable 2D Gaze Estimation Network," IEEE, pp. 1137-1139 (Year: 2021).*

Kim et al "Real-Time Image Magnifier with Visible-Spectrum Gaze Tracker," IEEE, pp. 22-23 (Year: 2018).*

Li et al "Eye-Gaze Tracking System by Haar Cascade Classifier," IEEE, pp. 564-567 (Year: 2016).*

Su et al "Toward Precise Gaze Estimation for Mobile-Head Mounted Gaze Tracking Systems," IEEE, pp. 2660-2672 (Year: 2018).*

Google Patents Translation of JP2015504616A pp. 1-130 (Year: 2015).*

Das et al "Sclera Recognition—A Survey," IEEE Computer Society, pp. 917-921 (Year: 2013).*

Zhu et al "Eye Gaze Tracking Under Natural Head Movements," IEEE, pp. 1-6 (Year: 2005).*

PCT International Search Report and Written Opinion; Application No. PCTUS2022082605 Jumio Corporation, International filing date of Dec. 30, 2022, date of mailing Jul. 7, 2023, 25 pages.

UK Intellectual Property Office, Combined Search and Examination Report under Sections 17 and 18(3) Application No. GB2409088.8, mail date Jul. 21, 2026.

* cited by examiner

BIOMETRIC AUTHENTICATION USING HEAD-MOUNTED DEVICES

CROSS REFERENCE TO RELATED APPLICATION(S)

This application claims priority to U.S. Patent Application No. 63/297,636, titled "Biometric Authentication Using Head-Mounted Devices," filed Jan. 7, 2022, which is hereby incorporated by reference in its entirety.

FIELD OF THE DISCLOSURE

The present disclosure relates to authenticating users with imaging systems of wearable, head-mounted devices such as virtual reality headsets and smartglasses.

BACKGROUND

Systems incorporating a biometric identification technology such as face recognition or iris recognition often include a camera that captures an image of a user. The captured image can be then processed to authenticate the user using the biometric identification technology.

Virtual reality headsets are head-mounted devices that provide a virtual reality experience to a wearer. Virtual reality experiences include videogames, simulators, and trainers. Augmented reality headsets are head-mounted devices that provide augmented reality experiences in which real-world environments are enhanced by computer-generated perceptual information. Smartglasses are wearable computer glasses that add information alongside or to what the wearer sees, such as by a heads-up display or an augmented reality overlay. Head-mounted devices can also provide other functionalities such as point of view cameras or audio playback.

SUMMARY

Some aspects of the present disclosure describe a head-mounted wearable device. The head-mounted wearable device includes a frame mountable on a head of a user, an infrared imaging device arranged to image a face of the user when the frame is mounted on the head of the user; and a computing system configured to perform operations. The operations include: causing the infrared imaging device to capture an image of the face of the user using infrared light received at the infrared imaging device; and initiating a biometric authentication process based on the image.

In one implementation, the head-mounted wearable device includes a visible-light imaging device arranged to image the face of the user when the frame is mounted on the head of the user. In some implementations, this may include imaging the ocular portion of the face. The computing system is configured to perform operations including causing the visible-light imaging device to capture a second image of the face of the user using visible light received at the visible-light imaging device, wherein the biometric authentication process is further based on the second image.

An example of a method includes causing an inward-facing infrared imaging device of a head-mounted wearable device to capture an image of a face of a user wearing the head-mounted wearable device; and initiating a biometric authentication process based on the image. In some examples of a method, the method includes causing an inward-facing visible-light imaging device to capture a second image of the face of the user, wherein the biometric authentication process is further based on the second image.

Implementations of this and other head-mounted wearable devices and methods can have any one or more of at least the following characteristics.

In some implementations, the head-mounted wearable device includes an infrared illuminator arranged to illuminate the face of the user with infrared light.

In some implementations, the infrared illuminator includes a diffuser configured to diffuse infrared light emitted by the infrared illuminator.

In some implementations, the head-mounted wearable device includes a visible-light imaging device arranged to image the face of the user when the frame is mounted on the head of the user.

In some implementations, the head-mounted wearable device includes a visible-light illuminator arranged to illuminate the face of the user with visible light.

In some implementations, the operations include causing the visible-light imaging device to capture a second image of the face of the user using visible light received at the visible-light imaging device. The biometric authentication process is further based on the second image.

In some implementations, the biometric authentication process is based on ocular surface vasculature features in the second image.

In some implementations, the biometric authentication process is based on subdermal vasculature features in the image.

Some aspects of this disclosure describe another head-mounted wearable device, which can share characteristics with other head-mounted wearable devices described herein. The head-mounted wearable device includes a frame mountable on a head of a user; an imaging system arranged to image a face of the user from a lateral imaging angle of at least 45° when the frame is mounted on the head of the user; and a computing system. The computing system is configured to perform operations including causing the imaging system to capture an image of the face of the user; and initiating a biometric authentication process based on the image.

Implementations of this and other head-mounted wearable devices can have any one or more of at least the following characteristics.

In some implementations, the imaging system is arranged to image the face from a vertical imaging angle of at least 10° when the frame is mounted on the head of the user.

In some implementations, the lateral imaging angle is at least 65°.

In some implementations, the lateral imaging angle is less than 85°.

In some implementations, the biometric authentication process is based on a non-ocular facial region of the user in the image.

In some implementations, the biometric authentication process is based on subdermal vasculature features of the non-ocular facial region of the user in the image.

In some implementations, the head-mounted wearable device includes a second camera arranged to image the user when the frame is mounted on the head of the user, the second camera having a different field of view from a field of view of the camera.

In some implementations, the biometric authentication process is based on both vascular and non-vascular visible features on the sclera of the user in the image.

Some aspects of this disclosure describe another head-mounted wearable device, which can share characteristics with other head-mounted wearable devices described herein. The head-mounted wearable device includes a frame mountable on a head of a user; an imaging system including one or more cameras arranged to image a face of the user when the frame is mounted on the head of the user; and a computing system configured to perform operations. The operations include causing the imaging system to capture a first image of the face, the first image focused at a first distance from the imaging system; causing the imaging system to capture a second image of the face, the second image focused at a second distance from the imaging system; and initiating a biometric authentication process based on at least one of the first image or the second image.

Implementations of this and other head-mounted wearable devices can have any one or more of at least the following characteristics.

In some implementations, the operations include determining a first focus quality metric of the first image and a second focus quality metric of the second image; and selecting one of the first image or the second image to use in the biometric authentication process based on the first focus quality metric and the second focus quality metric.

In some implementations, the operations include: identifying a first in-focus portion of the first image; identifying a second in-focus portion of the second image; and initiating the biometric authentication process based on the first in-focus portion of the first image and the second in-focus portion of the second image.

In some implementations, the imaging system includes a first camera focused at the first distance; and a second camera focused at the second distance.

In some implementations, the first camera is configured to image at least one of an in-focus nasal region, an in-focus portion of a periocular region adjacent to the nasal region, or an in-focus portion of an infraorbital region adjacent to the nasal region when the frame is mounted on the head of the user, and the second camera is configured to image at least one of an in-focus eye, an in-focus temporal region, or an in-focus zygomatic region of the user when the frame is mounted on the head of the user.

In some implementations, the imaging system includes a camera, and a focusing mechanism adjustable by the computing system to configure two or more focus distances of the camera.

In some implementations, the biometric authentication process is based on the first image and the second image.

Some aspects of this disclosure describe a biometric authentication method. The method can be performed by a computing system of a wearable device, by a remote computing system, by a combination thereof, and/or by another computing system. The method includes causing an inward-facing camera of a head-mounted wearable device to capture a first image of an eye region of a user; identifying subdermal features in a non-ocular facial region of the user in the first image; comparing the identified subdermal features to corresponding subdermal features in a second image, to obtain a comparison result; and based on the comparison result, controlling access to a secure system.

Implementations of this and other biometric authentication methods described herein can have any one or more of at least the following characteristics.

In some implementations, comparing the identified subdermal features to corresponding features in the second image includes identifying at least one of a corner of an eye of the user in the first image, or a lower eyelid of the eye of the user in the first image; and aligning the first image with the second image using the at least one of the identified corner of the eye or the identified lower eyelid.

In some implementations, aligning the first image with the second image includes using the corner of the eye as an anchor point for alignment of the first image and the second image.

In some implementations, aligning the first image with the second image includes using the lower eyelid of the eye to determine an affine alignment between the first image and the second image.

In some implementations, the affine alignment includes a rotation.

In some implementations, the subdermal features include subdermal vasculature.

In some implementations, causing the inward-facing camera to capture the first image includes causing the inward-facing camera to capture an infrared image.

In some implementations, the subdermal features are in at least one of a temporal region, a zygomatic region, or a buccal region.

Some aspects of this disclosure describe another biometric authentication method, which can share characteristics with other biometric authentication methods described herein. The biometric authentication method includes controlling an inward-facing display of a head-mounted wearable device to display one or more graphical fixation features configured to direct a gaze of a user of the head-mounted wearable device; during presentation of the one or more graphical fixation features, causing an inward-facing imaging device of the head-mounted wearable device to capture an image of an eye of the user; and initiating a biometric authentication process based on the image.

Implementations of this and other biometric authentication methods can have any one or more of at least the following characteristics.

In some implementations, the one or more graphical fixation features are configured to direct the gaze of the user in an upward direction.

In some implementations, the one or more graphical fixation features are configured to direct the gaze of the user in a straight forward direction.

In some implementations, the one or more graphical fixation features include, displayed at a first time, a first graphical fixation feature configured to direct the gaze of the user to the right, and, displayed at a second time, a second graphical fixation feature configured to direct the gaze of the user to the left.

In some implementations, the biometric authentication process is based on features of ocular surface vasculature seen atop the sclera of the user in the image, and the one or more graphical fixation features are configured to cause exposure of more of the sclera than is displayed when the gaze of the user is directed directly at the imaging device.

In some implementations, the method includes causing the inward-facing display to display an illuminating background behind the one or more graphical fixation features, the illuminating background configured to illuminate the eye of the user for imaging.

In some implementations, the illuminating background has a gradient of brightness.

In some implementations, the brightness decreases radially from one or more central points.

In some implementations, the illuminating background is white or cyan.

Implementations of the subject matter described in this specification can be implemented to realize one or more advantages. For example, in some implementations, imaging system positioning can provide unobstructed views of portions of the face useful for biometric authentication, in a manner compatible with wearable, head-mounted devices. In some implementations, imaging and/or illumination light wavelengths are configured for imaging of facial features compatible with wearable, head-mounted devices. In some implementations, a multi-focus-distance system allows for in-focus imaging at multiple facial distances, improving biometric authentication reliability and accuracy. In some implementations, multi-angle imaging allows for improved image-to-image registration, improving biometric authentication and reliability. In some implementations, graphical fixation features can be used to direct user gaze, improving imaging consistency and/or image usefulness. In some implementations, eye features are used to perform image registration compatible with wearable, head-mounted devices.

In some implementations, the head-mounted wearable device performs a biometric authentication process based on an iris color shade measurement.

In some implementations, the head-mounted wearable device performs a biometric authentication process based on a partial three-dimensional scan of points on a user's face.

In some implementations, the head-mounted wearable device performs a biometric authentication process that includes generating a display image, monitoring an ocular reflection of the displayed image, generating a corneal topographic map, and using the corneal topographic map for biometric authentication.

In some implementations, the head-mounted wearable device performs a measurement of arm length, wherein the biometric authentication is based at least in part on the measurement of arm length.

In some implementations head-mounted wearable device performs a measurement of a portion of a user's head using a mechanical sensor, including at least one of a nose width measurement, an eye-to-eye measurement, and a skull width measurement at the ear loop, wherein the biometric authentication is based at least in part on the measurement.

The details of one or more implementations are set forth in the accompanying drawings and the description below. Other aspects, features and advantages will be apparent from the description and drawings, and from the claims.

DETAILED DESCRIPTION

Biometric authentication systems can authenticate a user of a secure system based on recognizing the user's face, Eyeprint, iris, etc. Such biometric authentication systems involve capturing one or more images of the user and executing corresponding recognition processes on the captured image. Various biometric authentication techniques have been established for technological environments such as personal computers, handheld mobile devices, and kiosks. However, the spatial and hardware limits of head-mounted wearable devices, such as virtual or augmented reality (AR/VR) goggles/headset and smartglasses (collectively referred to herein as head-mounted wearable devices, or HMWs), present challenges for biometric authentication. As described in this disclosure, imaging systems, illumination systems, display systems, and computing systems can be configured to perform biometric authentication in HMWs.

Figure 1:
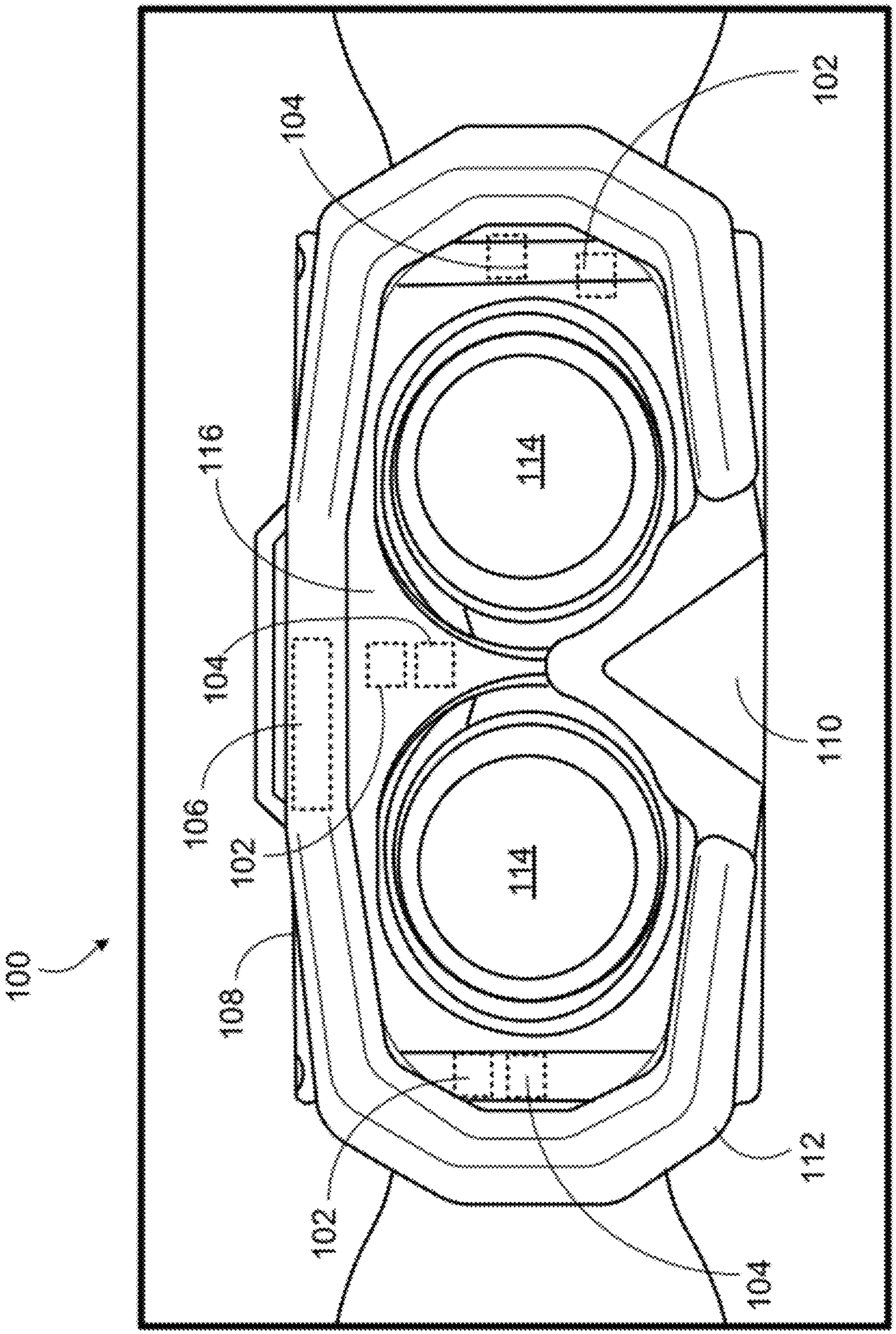
FIG. 1 is a diagram illustrating an example head-mounted wearable device in accordance with an implementation.

As shown in FIG. 1, an HMW 100 (in this example, an augmented reality headset) includes a frame 108 configured to be mounted on a head of a user. For example, the frame 108 can include straps (e.g., lateral strap that are positioned behind and/or over the user's ears, and/or a top strap positioned on top of the user's head), a nose pad 110, a foam seal 112 that provides a comfortable fit between the frame 108 and the user, and a body 116 that supports and/or contains the other components of the HMW 100.

One or more displays 114 are arranged to present graphics to the user when the HMW is worn by the user. In some implementations, the one or more displays 114 are adjustable, e.g., to adjust a distance between two displays 114 to account for different eye-to-eye spacings in different users.

To implement biometric authentication, one or more imaging systems 102—each including one or more imaging devices—and, in some implementations, one or more illumination systems 104—each including one or more illuminators operable to emit light—are arranged on a user-facing side of the HMW 100, e.g., mounted on and/or in the frame 108. The imaging systems 102 and illumination systems 104 are inward-facing, meaning that they are arranged to image or illuminate the face of the user when the user wears the HMW 100. As described in more detail below, the imaging systems 102 and illumination systems 104 can be configured for various combinations of light wavelength ranges, focus distances, imaging perspectives, and fields of view of the face, in order to provide for accurate and reproducible biometric authentication.

The imaging devices of the imaging systems 102 can include, for example, digital cameras, three-dimensional (3D) cameras, an/or light field sensors. The imaging devices can employ a variety of technologies, e.g., digital charge-coupled devices (CCD), complementary metal-oxide-semiconductor (CMOS) devices, or quantum dot photoconductors/photodiodes. In some implementations, arrays of imaging devices are used to obtain a complete image. Imaging devices such as cameras can include complementary optical devices such as lenses and/or filters to focus light onto the imaging devices and to sense specific wavelengths of light.

The illuminators of the illumination systems 104 can include light emitting diodes (LEDs), incandescent illumination sources, lasers (e.g., in conjunction with diffusers), or other types of light-emitting devices.

A computing system 106 is communicatively coupled to other components of the HWM 100, such as the imaging systems 102, the illumination systems 104, and the displays 114. The computing system 106 is configured to control the other components to perform various operations, such as illumination (e.g., switching illuminators on/off, adjusting a level of illumination emitted, and/or adjusting a type (e.g., color/wavelength) of illumination emitted), image capture (e.g., causing the imaging systems 102 to capture images, and receiving data representing the captured images), graphical display (e.g., causing the displays 114 to display video, augmented reality overlays, and/or graphical fixation features), and biometric authentication processes. For biometric authentication processes, the computing system 106 can receive one or more images captured by the imaging systems 102 and perform one or more analysis operations such as spoof detection and image comparison, to determine (i) whether the imaged user is a live user (as opposed to a spoof representation of a live user, such as a displayed face or a mask), and (ii) whether the imaged user is a biometric match for another user that has access to one or more secure systems. Biometric authentication processes can alternatively, or in addition, be carried out by a remote computing system, such as a cloud-based computing system communicatively coupled to the computing system 106 over one or more networks (e.g., the Internet).

The HMW 100 can includes other components in various implementations, such as gyroscopes, audio devices (e.g., microphones and/or speakers), accelerometers, magnetometers, and/or structured light systems.

Figure 2:
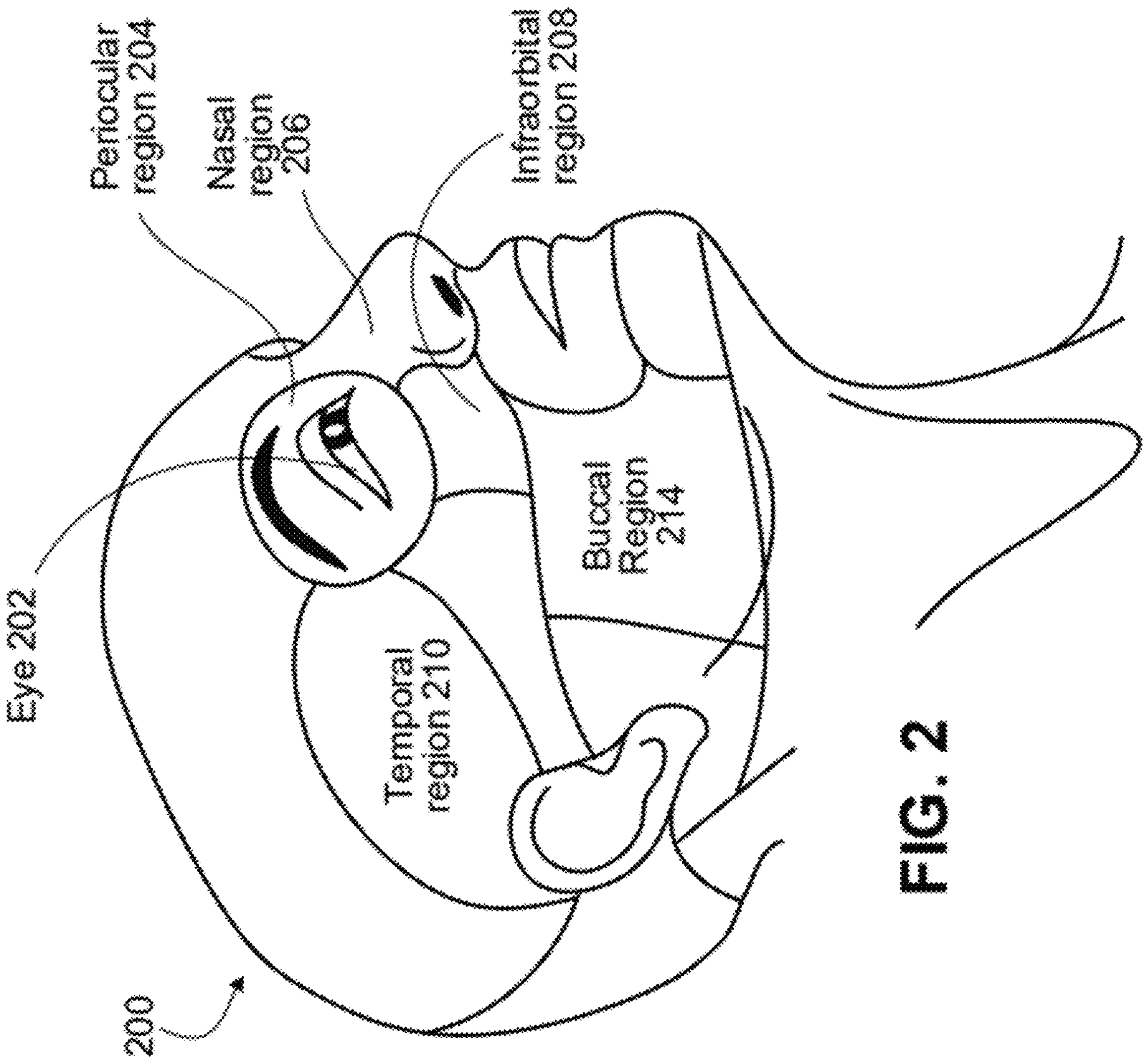
FIG. 2 is a diagram illustrating regions of a face that can be used for biometric authentication in accordance with an implementation.

Because of the position of the HMW with respect to the user, image-based biometric authentication of users by the HMW can be performed on images of particular portions of the face. FIG. 2 shows example regions of a face 200 that can be used for biometric authentication, according to various implementations of this disclosure. The eye 202 of the face 200 includes an iris having patterns that can be analyzed by visible and/or infrared imaging (e.g., near-infrared (700 nm-900 nm) imaging). Patterns of the iris can be encoded (e.g., using a Gabor wavelet transform) and then compared to one or more reference iris codes to check for a biometric match. For example, a match score can be calculated between the iris code and a reference iris code obtained previously, e.g., in a user registration process, to see whether the match score satisfies a match condition. For example, in some implementations, if the match score is above a predetermined threshold value, then it is determined that the imaged user is the user corresponding to the reference iris code. Example methods of iris identifier creation and matching based on captured image(s) of the iris can be found in U.S. Pat. No. 10,832,053, the entirety of which is incorporated herein by reference.

The eye 202 also includes a sclera, the "white" of the eye 202. Vasculature and other visible features seen on the sclera, mostly due to episcleral and conjunctival layers of the eye, and sometimes referred to eye surface vasculature, can be identified in visible light images of the white of the eye and analyzed to obtain eye surface vasculature identifiers (e.g., descriptor vectors), which can be compared to reference eye surface vasculature identifiers to determine a match or lack of match therebetween. In some example analysis methods, an image of the eye 202 is segmented into regions to identify the sclera or a portion thereof, one or more identified regions are preprocessed (e.g., by contrast limited adaptive histogram equalization and/or filtering), and one or more eye surface vasculature descriptors are obtained by applying a set of filters (e.g., Gabor filters) to the preprocessed regions. A match score can be calculated between the eye surface vasculature descriptors and a reference eye surface vasculature descriptor obtained previously, e.g., in a user registration process, to see whether the match score satisfies a match condition. For example, in some implementations, if the match score is above a predetermined threshold value, then it is determined that the imaged user is the user corresponding to the reference eye surface vasculature descriptor. Example methods of sclera-based biometric authentication can be found in U.S. Pat. Nos. 8,369,595 and 9,390,327, the entirety of which are incorporated herein by reference.

"Visible light imaging," "visible image," "infrared imaging," and "infrared image," as used herein, refer to at least one of (i) a type of light-sensitive photodetector (e.g., camera) used to perform the imaging/capture the image, or (ii) a type of illumination applied to the imaged subject for capture of the image. A visible light image can be an image captured by a visible light camera that is more sensitive to visible light than to another type of light (e.g., infrared light), and/or can be an image captured of a subject when the subject is illuminated more by visible light than by another type of light (e.g., infrared light). An infrared image can be an image captured by an infrared light camera that is more sensitive to infrared light than to another type of light (e.g., visible light), and/or can be an image captured of a subject when the subject is illuminated more by infrared light than by another type of light (e.g., visible light). A visible light illuminator is an illuminator operable to emit visible light more than another type of light (e.g., infrared light). An infrared illuminator is an illuminator operable to emit infrared light more than another type of light (e.g., visible light).

Visible light can include light having a wavelength between 380 nm to 750 nm. Infrared light can include light having a wavelength between 750 nm to 1 mm, with near-infrared light having a wavelength between 750 nm and 3 μm (e.g., in some implementations, between 750 nm and 1.4 μm).

Referring again to FIG. 2, immediately surrounding the eye 202 is a periocular region 204 that is external to and, in some instances, abutting the eyelid edges. Adjacent to the periocular region 204 are a temporal region 210 that overlies the temporal bone; a zygomatic region 212 that overlies the zygomatic bone (representing, e.g., the prominence above the cheek); a nasal region 206 that includes the nose (e.g., the nose blade); and an infraorbital region 208 below the periocular region 204 and adjacent to the nasal region 206. A buccal region 214 lies below the zygomatic region 212 and the infraorbital region 208, including generally the cheek. These regions of the exterior of the face, excluding the eye 202 itself, are referred to collectively herein as non-ocular facial regions.

The non-ocular facial regions have visual features that can be analyzed for biometric authentication. For example, unique texture, surface vasculature, and sub-dermal vasculature (blood vessel and vein) features of the non-ocular facial regions can be used as a biometric signature of a user for biometric comparison/authentication. "Texture" refers to features such as skin micro-patterns, wrinkles, folds, and/or spots, any or all of which can be used as a biometric signature. A biometric enrollment process for non-ocular facial region authentication can include capture of one or more images of the face of the registering user; identification of points of interest in the one or more images (e.g., using vascular point detection (VPD)); and generation of feature vectors describing a local region around each identified point of interest, to obtain an enrollment template including a set of candidate points and corresponding descriptors. The set of candidate points can be an overall set of candidate points for a face (e.g., across multiple non-ocular facial regions or all of the above-described non-ocular facial regions) or can be confined to a particular region, such as a set of candidate points and corresponding descriptors for the periocular region. In a subsequent matching process, one or more images of a user are captured, and a match score is generated between the one or more images and the previously-captured one or more images corresponding to the enrollment template. For example, the match score can be based on a distance metric (e.g., a Euclidean distance) between descriptors of interest points in the enrollment template and a new template generated for the newly-captured user.

Among the vasculature features that can be used for non-ocular facial region authentication are the frontal branch, the lacrimal artery, the zygomatic-orbital branch, the transverse facial branch, the supraorbital artery, the frontal artery, the dorsal nasal artery, the angular artery, the infraorbital artery, the temporal artery, and the facial artery, and veins and/or capillaries that connect to these vascular features.

In some implementations, a process for iris matching, eye surface vasculature matching, periocular matching. and/or non-ocular facial region matching (e.g., using texture and/or surface/subdermal vasculature features) includes three phases: image registration, enhancement, and feature extraction and matching. In the image registration phase, a newly-captured image is aligned with a template image or its original camera capture pose. This can correct for changes in camera position between the images. Some examples of image registration for biometric authentication in HMWs are provided below in reference to FIGS. 8A-8C.

The enhancement phase can include one or more of various processes. In some implementations, image segmentation is performed to identify particular region(s) of interest for further analysis, identify particular region(s) to exclude from analysis, or both. For example, a sclera can be identified and segmented from the rest of the image to be analyzed in a manner that excludes, for example, surrounding skin. As another example, eyelashes can be detected and excluded from feature extraction in vascular matching of the periocular region. In some implementations, an eye can be identified and excluded from an analysis that focuses on, for example, subdermal vasculature features. Some examples of enhancement phase processing include image processing to enhance target features of images. For example, eye vasculature, non-ocular facial region vasculature, and skin texture in non-ocular facial regions can be enhanced using CLAHE (Contrast Limited Adaptive Histogram Equalization), Gabor filtering, and/or SQI (Self-Quotient Image) processing. Some examples of enhancement phase processing include a denoising algorithm, e.g., in response to a determination that the image ISO is above a threshold value (e.g., 400). Denoising can be advantageous for biometric authentication using HMWs, for which light levels can be low.

In the feature extraction and matching phase, features are extracted using one or more methods. Some implementations include a point/region identification method such as VPD, to identify and extract features (e.g., local descriptors). Methods used for descriptor determination can include, for example, a Convolutional Neural Network (CNN) trained to generate descriptors as output, Extended Multi-Radii Local Binary Patterns (EMR-LBP) algorithms, Pattern Histograms of Extended Multi-Radii Local Binary Patterns (PH-EMR-LBP) algorithms, Pattern Extended Multi-Radii Center Symmetric Local Binary Patterns (PEMR-CS-LBP) algorithms, Pattern Histograms of EMR-CS-LBPs (PH-EMR-CS-LBP) algorithms, tiled EMR-IBP algorithms, tiled PH-EMR-LBP algorithms, tiled PEMR-CS-LBP algorithms, and/or tiled PH-EMR-CS-LBP algorithms. Interest points can be identified using one or more methods such as Accelerated Segment Test (FAST) algorithms, Speeded Up Robust Features (SURF) algorithms, VPD, MR-Points algorithms, and/or CNNs trained to generate, as output, one or more identified interest points. In some implementations, the image is input into a trained machine learning network, CNN, and the machine learning network produces, as output, a set of extracted features indicative of a unique biometric signature.

Once determined, features/descriptors are matched against features/descriptors in enrollment templates to determine a match or a lack of a match. For example, a match score can be determined and compared to a threshold value; a match score above the threshold value indicates a successful match, corresponding to a successful identification of an authenticating user. In some implementations, a cosine similarity or other algorithmic similarity metric can be used. In some implementations, a random sample consensus (RANSAC) or other outlier detection method can be used to determine a transformation needed to align points of interest in a template image with points of interest in a newly-captured image; an inliers and transformation matrix can be used to determine a match or lack thereof. Examples of biometric authentication methods (e.g., for non-ocular facial region matching), including matching algorithms, can be found in U.S. Pat. No. 9,836,643, the entirety of which is incorporated herein by reference. These methods can also be used for ocular (e.g., iris and/or eye surface vasculature) matching.

These and other biometric authentication processes/operations can be performed by the computing system 106, by a remote computing system communicatively coupled to the computing system 106, or by a combination thereof. For example, in some implementations the computing system 106 is configured to transmit one or more captured images to the remote computing system, which implements the biometric authentication operations and transmits a result (e.g., match or no match) back to the computing system 106. When the computing system 106 is configured to initiate a biometric authentication process based on one or more images, the computing system 106 can be configured to initiate a process in which the one or more images, and/or features/portions thereof, are matched against one or more reference images, and/or features/portions thereof, to identify a biometric match between a user portrayed in the one or more images and a user portrayed in the one or more reference images, e.g., as described throughout this disclosure. The computing system 106 can perform the matching process itself and/or can initiate the matching process at a remote computing system by transmitting the one or more images to the remote computing system.

Biometric authentication processes can be performed at various times. In some implementations, a biometric authentication process is performed when a user of an HMW attempts to access a secure system. For example, the secure system can be the HMW itself (e.g., unlocking the HMW for use), a subset of functions of the HMW (e.g., gaining access to configuration options of the HMW), or another system accessed using the HMW. For example, the biometric authentication process can be used to confirm or deny access to a website or application that the user is attempting to access using the HMW.

Given the spatial constraints of HMWs, in some cases, particular imaging perspectives can be particularly useful for biometric authentication. For example, in some implementations a lateral or semi-lateral imaging perspective can be used to increase an area of the face that is imaged. As shown in FIG. 3A, for an HMW 300, in reference to an eye 302 of a user wearing the HMW 300 (e.g., in reference to a pupil of the eye 302), a lateral imaging angle 304 can be defined between a head-on direction 306 that is directly ahead for the eye 302 and a direction 308 of an inward-facing imaging system 102 (e.g., a direction of a camera or other imaging sensor of the imaging system 102). A frontal imaging system has a lateral imaging angle (shown as angle θ 304 in FIG. 3A) of 0° (or, in some implementations, between −5° and 5°, or between −10° and 10°); a lateral imaging system has a lateral imaging angle 304 of 90° (e.g., between 85° and 95°, or between 80° and 100°); and a semi-lateral imaging system has a lateral imaging angle 304, in various implementations, of at least 30°, at least 45°, at least 60°, or at least 75°; and/or less than 90°, less than 85°, less than 80°, less than 75°, less than 70°, or less than 65°. A non-frontal perspective can be useful (i) because the frontal portion of the HMW may be occupied by other hardware such as eye-cups and displays, (ii) the frontal portion of the HMW may be too close to the user to capture images having a sufficiently wide field-of-view to show sufficient features for matching, and (iii) the non-frontal perspective can capture portions of the user's face that may be obscured from other perspectives, such as the temporal region, the zygomatic region, the periocular region, and/or the sclera. A semi-lateral (as opposed to exactly lateral) imaging perspective can similarly allow for less obscured imaging, e.g., of the temporal region, the zygomatic region, the periocular region, and/or the sclera. Inclusion of these otherwise-obscured regions can allow for more accurate biometric determinations.

Figure 3B:
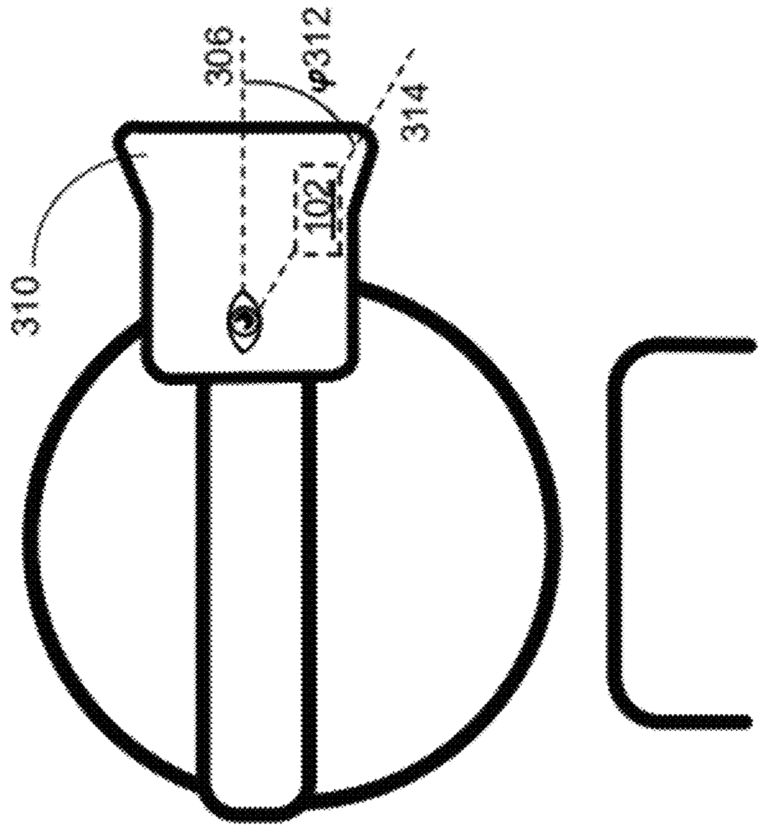
FIGS. 3A-3B are diagrams illustrating example imaging system positioning in accordance with an implementation.
Figure 3A:
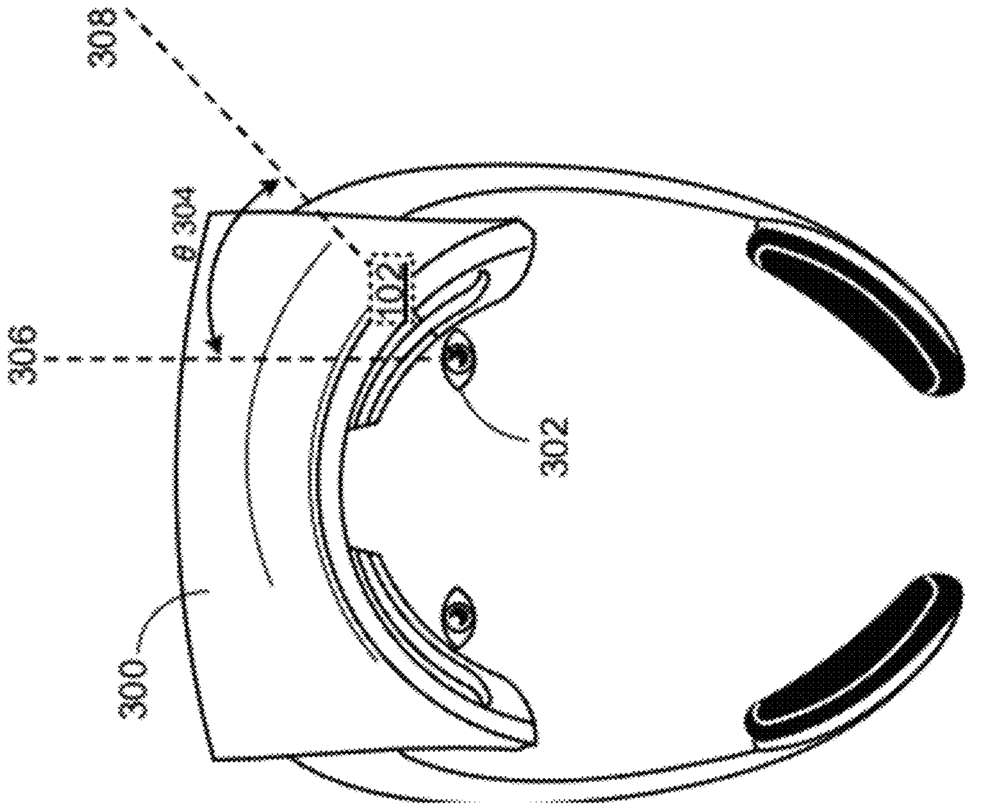

As shown in FIG. 3B, in some implementations, in reference to the eye 302 of a user wearing the HMW 310 (e.g., in reference to a pupil of the eye 302), a vertical imaging angle (shown as angle φ 312 in FIG. 3B) can be defined between the head-on direction 306 and a direction 314 of an inward-facing imaging system 102 (e.g., a direction of a camera or other imaging sensor of the imaging sensor 102). In some implementations, the vertical imaging angle is such that the imaging system 102 provides an upward (from below) imaging perspective of the eye 302 of the user and, in some implementations, one or more other facial regions. This can allow for capture of portions of the user's face that may be obscured from other perspectives, such as the infraorbital region, the periocular region, and/or the sclera. For example, the vertical imaging angle 312 (measured positively down from the head-on direction 306) can be at least 5°, at least 10°, at least 15°, at least 20°, or at least 25°; and/or less than 80°, less than 70°, less than 60°, less than 50°, less than 40°, or less than 30°. A downward imaging perspective is one that has a negative vertical imaging angle as defined herein.

Figure 4B:
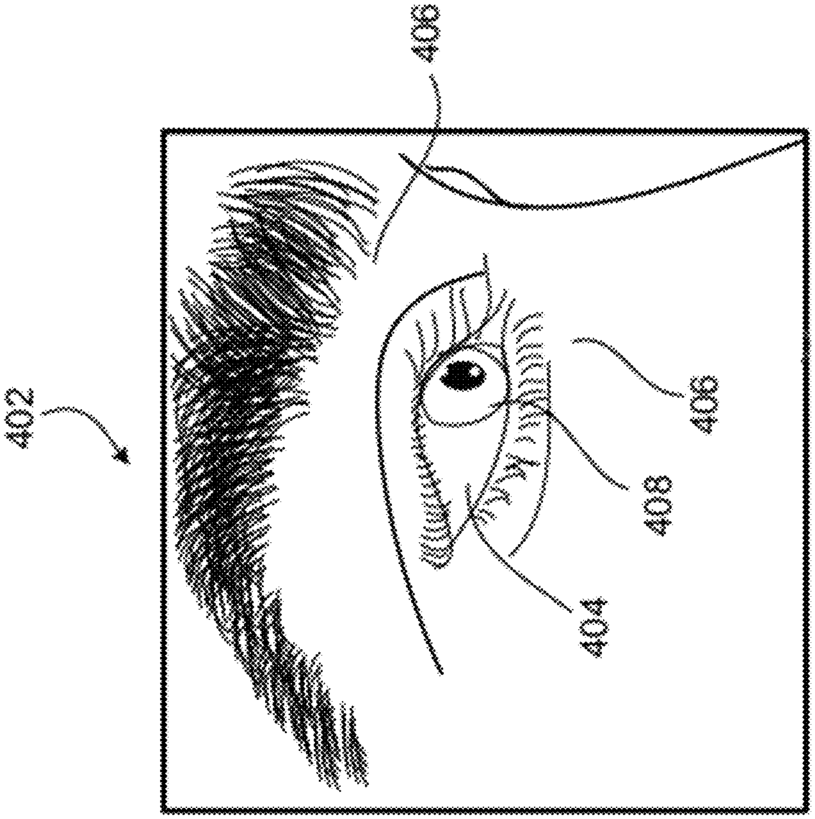
FIGS. 4A-4B are example images taken from two different imaging angles in accordance with an implementation.
Figure 4A:
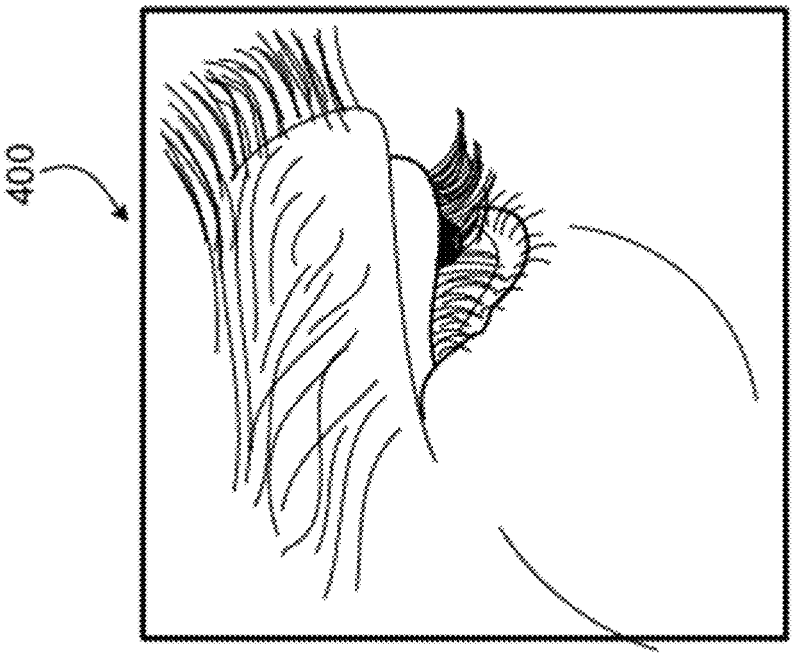

FIGS. 4A-4B show an example of imaging improvement stemming from a semi-lateral and upward imaging perspective. In FIG. 4A, a subject is imaged from a lateral imaging angle of 90° and a vertical imaging angle of 0°. In FIG. 4B, the subject is imaged from a lateral viewing angle of 20° and a vertical viewing angle of 10°. Compared to the image 400 of FIG. 4A, the image 402 of FIG. 4B shows more of the iris 408, sclera 404, and portions of the periocular region 406 above and below the eye that are close to the nasal region. Accordingly, coloration, texture, and/or vasculature of these regions can be better incorporated into biometric authentication processes, improving their reliability and accuracy.

In various implementations, HMWs can include multiple imaging systems having multiple imaging perspectives, such as semi-lateral and upward, lateral and downward, frontal and upward, frontal and head-on (directly into the pupil without tilt in any direction), or any other combination of angles. For example, one side of a face can be captured from multiple imaging angles, and/or two sides of the face can be captured by the same and/or different imaging angles by two or more imaging systems. In some implementations, inclusion of additional imaging systems to capture more of the face (different perspectives/fields of view of one side of the face, two sides of the face, or both) can provide corresponding improvements to biometric authentication because of the corresponding capture of additional features such as vasculature points of interest.

Imaging systems and illumination systems can be configured in various ways for capture of images that are well-suited for biometric authentication. For example, subdermal features such as subdermal vasculature, along with skin texture, can be well-captured by infrared imaging. Imaging by infrared light can be particularly compatible with HMW biometric authentication, because infrared illuminators can be close to the face so as to penetrate skin effectively. Near-infrared imaging is also effective for iris authentication. Accordingly in some implementations, one or more of the imaging systems (e.g., imaging systems 102) is configured to capture infrared (e.g., near-infrared) images, and/or one or more of the illumination systems (e.g., illumination systems 104) is configured to emit infrared (e.g., near-infrared) light. One or more infrared images (e.g., of the skin of non-ocular facial regions) can then be analyzed to identify vasculature features and/or skin texture features and perform biometric authentication/matching, as described above.

As another example, in some implementations one or more of the imaging systems (e.g., imaging systems 102) and/or illumination systems (e.g., illumination systems 104) is configured to image with visible light. For example, one or more of the imaging systems is configured to capture visible light images, and/or one or more of the illumination systems is configured to emit visible light. Visible light can be more effective than other light for imaging the eye surface vasculature and surface features of skin, such as some texture features. In some cases, features can be better imaged by blue (450-485 nm light) and/or green (500-565 nm light) imaging than by red (625-750 nm light) imaging. For example, eye surface vasculature and skin texture features can be more prominent in the blue/green spectrum than in the red spectrum. Accordingly, in some implementations an imaging system and/or illumination system is configured for blue/green image capture. For example, in some implementations an illumination system includes separate blue/green and red light sources (e.g., LEDs), and, for capture of a blue/green image, the computing system 106 controls the illumination system to enable the blue and/or green light source(s), and to disable the red light source(s), when the image is captured. In some implementations, an illumination system includes one or more blue and/or green light sources and no red light sources, such that the illumination unit as a whole can be enabled (e.g., by control by the computing system 106) for capture of a blue/green image. Alternatively, or in addition, in some implementation an imaging system includes separate blue/green and red imaging devices (e.g., photosensitive pixels, or portions thereof, sensitive to blue/green or red light, such as an RGB camera), and, for capture of a blue/green image, the computing system 106 causes an image to be captured using the blue and/or green imaging devices and not the red imaging devices. In some implementations, an imaging system includes one or more blue and/or green imaging devices and no red imaging devices, such that the imaging system as a whole can be used by the computing system 106 for capture of a blue/green image.

In some implementations, one or more imaging systems are configured to capture images at multiple focus distances to capture images of multiple facial regions. Focusing on multiple facial regions is, in some cases, less challenging in kiosk-based and smartphone-based biometric authentication systems, because, given the typically larger camera-face distances of those systems, the proportional change in focus distances for different portions of the face is relatively small. In addition, typical biometric authentication systems are configured to image the face head-on and, accordingly, need not handle imaging distances that differ substantially. By contrast, HMW-based imaging systems are arranged very close to the face, such that different portions of the face may be at distances from the camera that differ substantially, e.g., by 25%, 50%, 75%, or 100% of one another. In addition, for lateral and semi-lateral imaging angles, the breadth of the face can lead to large focus distance differences for different features. Imaging systems with large depth-of-field can be used to image over a wide focus distance simultaneously, but such systems can be bulky and/or expensive.

Figure 5A:
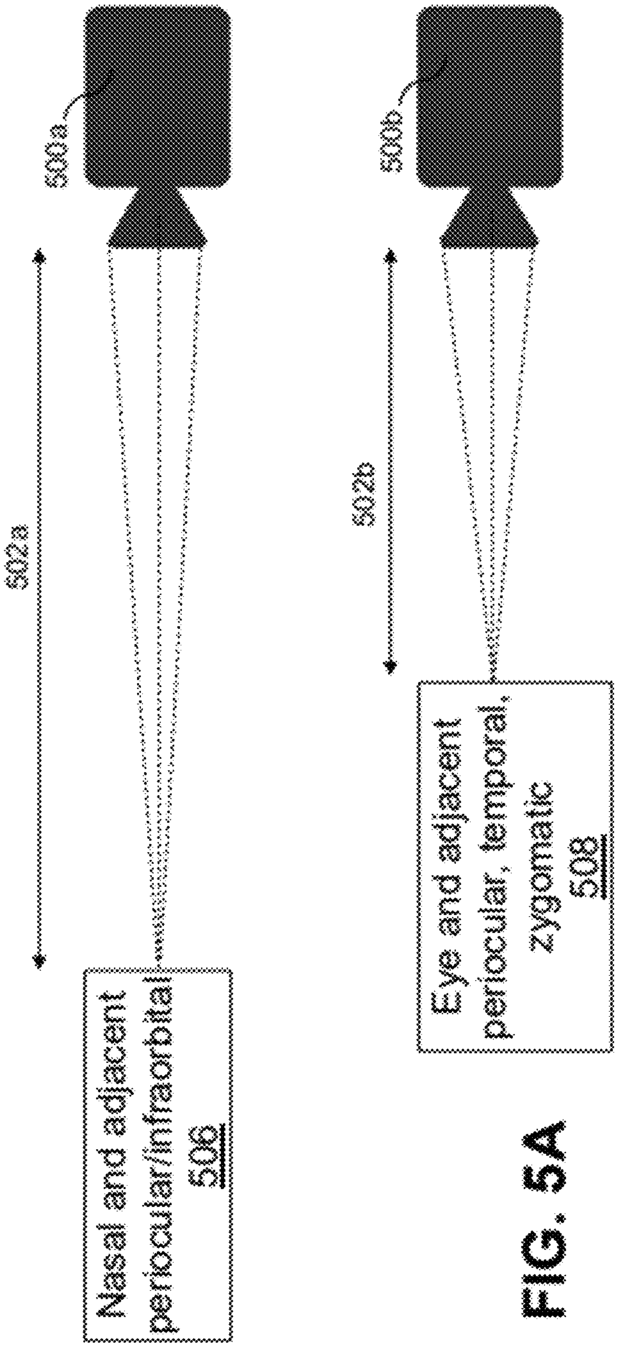
FIGS. 5A-5B are diagrams illustrating multi-focus-distance imaging in accordance with an implementation.

Accordingly, in some implementations, an HMW includes imaging systems, and/or portions of imaging systems, that are configured to capture images at two different focus distances. As shown in FIG. 5A, in some implementations, an HMW includes a first imaging device 500*a* (e.g., a camera) having a first focus distance 502*a* (e.g., a fixed focus distance) and a second imaging device 500*b* having a second focus distance 502*b* (e.g., a fixed focus distance), where the focus distances 502*a* and 502*b* are different from one another. The imaging devices 500*a*, 500*b* can be included in one imaging system (e.g., adjacent to one another) or in separate imaging systems (e.g., arranged at different locations in the HMW). In some implementations, the imaging devices 500*a*, 500*b* are at a common position and common distance with respect to the face, such that differences in focus distances between the imaging devices 500*a*, 500*b* define which portion(s) of the face each imaging device 500*a*, 500*b* is configured to capture. The focus distances 502*a*, 502*b* can differ from one another by at least 2 cm, at least 4 cm, at least 6 cm, at least 8 cm, or at least 10 cm (e.g., and by less than 20 cm). These distances can correspond to nose-to-zygomatic bone distances typical of users, such that the imaging devices 500*a*, 500*b* can image the face with different portions of the face in focus. For example, in some implementations the first imaging device 500*a* having the longer focus distance 502*a* is configured to capture an in-focus image of the nasal region and/or facial regions adjacent to the nasal region, such as portions of the periocular and infraorbital regions, and the second imaging device 500*b* is configured to capture an in-focus image of the eye and/or facial regions closer to a lateral or semi-lateral imaging angle, such as portions of the periocular, temporal, and/or zygomatic regions closer to a lateral or semi-lateral imaging angle. This configuration of focus distances is compatible with lateral or semi-lateral imaging angles of either or both of the imaging devices 500*a*, 500*b*.

Figure 5B:
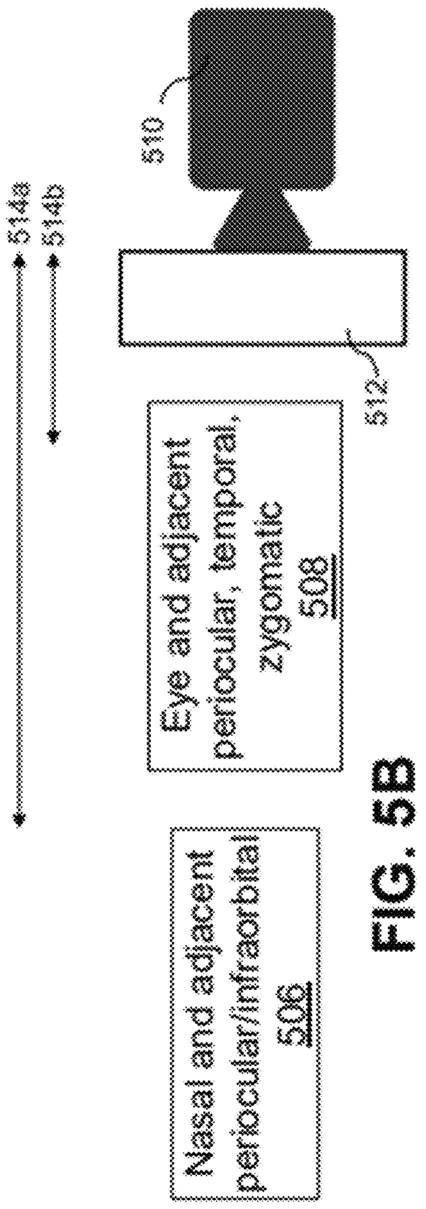

In some implementations, instead of or in addition to imaging devices having different focus distances, an HMW can include one or more imaging devices having adjustable focus distances. For example, as shown in FIG. 5B, an imaging device 510 is adjacent to an adjustable focus mechanism 512 that is configured to adjust a focusing distance of the imaging device 510. For example, in some implementations, the adjustable focus mechanism 512 is an electro-optical focus mechanism including a liquid crystal medium. Application of a voltage to the liquid crystal medium alters a refractive index of the liquid crystal medium, correspondingly altering the distance at which the imaging device 510 is focused. In some implementations, the adjustable focus mechanism 512 includes a mechanical focus mechanism, such as a system of lenses (e.g., rigid and/or flexible lenses) that can have relative positions adjusted (e.g., by a motorized mechanism) to adjust the focus distance. In some implementations, the adjustable focus mechanism 512 includes a lens having an adjustable level of fluid inside; fluid can be pumped in and out to adjust the focus distance. The adjustable focus mechanism 512 is configured to adjust so that the imaging device 510 captures two or more images at two or more focus distances 514*a*, 514*b*. These focus distances 514*a*, 514*b* can differ from one another by the distances provided for focus distances 502*a*, 502*b*, so that the imaging device 510 captures two or more in-focus images of different portions of the face as described for FIG. 5A.

The computing system 106 can be configured to cause the capture of the images at different focus distances. For example, the computing system 106 can be configured to cause imaging device 500*a* to capture a first image and to cause imaging device 500*b* to capture a second image. The two images can capture different portions of the face at two different focus distances, or can capture same or overlapping portions of the face with different portions of the images in-focus. The two images are then used for biometric authentication. For example, in some implementations the computing system 106 performs a focus sensing process to identify in-focus portions of the two images, and then performs biometric authentication using the in-focus portions (e.g., excluding out-of-focus portions). For example, the biometric authentication can be performed by identifying points of interest in the in-focus portions, and/or by providing the in-focus portions into a machine learning model or other model, as described above. In some implementations, the imaging devices 500*a*, 500*b* have different fields of view that capture respective in-focus portions of the face, such that the captured images can be directly used for biometric authentication without performing image processing to identify in-focus portions.

In some implementations, multiple images (frames) are captured at each of multiple focus distances in rapid succession (e.g., within less than one second, within less than half a second, within less than a quarter of a second, or within less than a tenth of a second). One or more of the frames can be removed, such as frames showing significant differences (e.g., user motion) compared to the other frames. For example, if a frame shows the user blinking and other frames show the user not blinking, the frame showing blinking can be removed from the analysis. Remaining frames are registered (aligned) with one another and averaged to obtain a reduced-noise frame or representation of a frame. In some implementations, the image stack is fed to one or more other multi-frame image enhancement routines such as multi-frame deconvolution and/or super resolution analysis to obtain the reduced-noise frame or representation of a frame.

As another example, the computing system 106 can be configured to adjust the adjustable focus mechanism 512 to capture images at the two different focus distances 514*a*, 514*b*. These images can be processed as described for images captured by imaging devices 500*a*, 500*b*, e.g., to identify respective different in-focus portions of the two images and to perform biometric authentication based on the in-focus portions.

In some implementations, the computing device 106 is configured to implement an auto-focusing routine to determine one or more focus distances that result in in-focus images of one or more portions of the face. The auto-focusing routine can be based on sets of imaging devices configured with different respective focus distances (e.g., imaging devices 500*a*, 500*b*), and/or based on adjustment of an adjustable focus mechanism (e.g., adjustable focus mechanism 512). In the former case, two or more imaging devices (e.g., cameras) having overlapping or identical fields of view have different respective focus distances. The computing device 106 causes the imaging devices to capture respective images and analyzes the images to identify which images (and/or portions thereof) are in-focus or out-of-focus. For example, the computing device 106 can calculate focus scores for entire images and/or for portions of images using intensity differences between adjacent pixels, by a spatial frequency-based analysis (e.g., a Fourier transform of an image or a portion thereof), a combination of these methods, and/or another method. In-focus images can have high-frequency content of their 2D fast Fourier transforms (FFTs) above a threshold value. Based on the focus scores, the computing device 106 can identify one or more images (and/or one or more portions of one or more images) to use for biometric authentication. For example, the computing device 106 can select an image that has a highest focus score. As another example, the computing device 106 can select a first image that has a highest focus score for one region of the face (e.g., the eye and/or portions of the periocular, temporal, and/or zygomatic regions that are lateral on the face) and can select a second image that has a highest focus score for a second region of the face (e.g., the nasal region and/or portions of the periocular and/or infraorbital regions that are adjacent to the nasal region). The high-scoring regions from the two images are then used for biometric authentication. Auto-focusing routines can be based on a priori knowledge of approximate distances of different parts of the face from the HMW-embedded camera(s). For example, the different focus distances tested using an adjustable focus mechanism can be centered at a known approximate distance between a camera and a particular portion of the face, e.g., for a user of average size.

In some implementations, an analogous process can be used for one or more imaging devices having focus distances controlled be corresponding adjustable focus mechanisms. The computing device 106 causes the adjustable focus mechanism to switch between two or more focus distances and causes a corresponding imaging device to capture an image at each focus distance. The computing device then analyzes the images to identify which images (and/or portions thereof) are in-focus or out-of-focus, and uses the results to select one or more images and/or one or more portions of one or more images to use for biometric authentication, as described above.

Figure 6A:
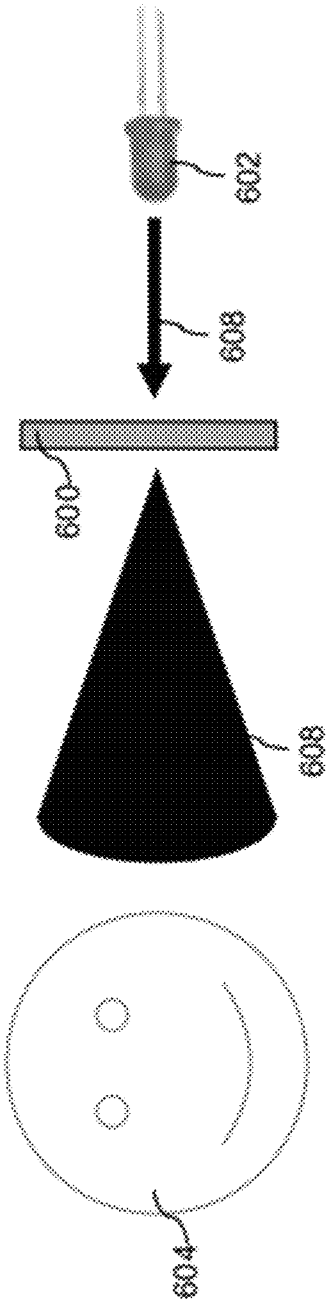
FIGS. 6A-6B are diagrams illustrating optical diffusers in accordance with an implementation.
Figure 6B:
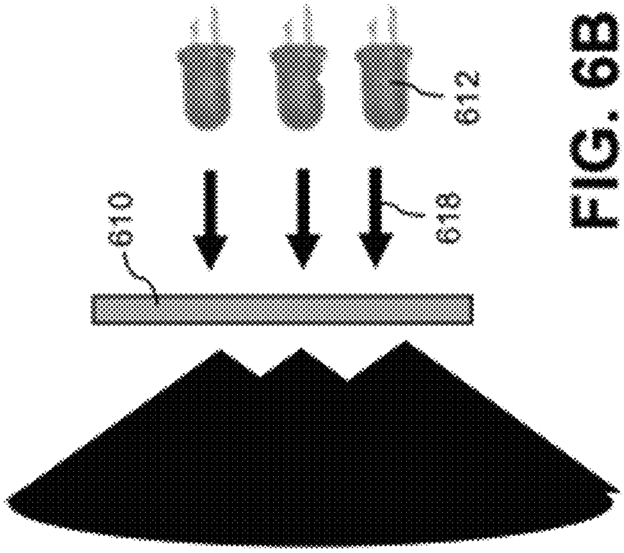

In some implementations, an imaging system includes one or more optical diffusers. For example, as shown in FIG. 6A, an optical diffuser 600 is arranged between an illuminator 602 and a user 604. Light 608 emitted by the illuminator 602 is diffused by the optical diffuser 600, and the diffused light is transmitted to the user 604. This can reduce hot spots (points/areas of high light intensity) in the illumination, providing more even brightness in images captured under the illumination 608. The optical diffuser 600 can include, for example, a ground glass diffuser, an engineered diffuser, a micro-lens based diffuser (e.g., an array of microlenses), a diffractive optical diffuser, and/or a holographic diffuser, or another optical diffuser type. In some implementations, as shown in FIG. 6B, an optical diffuser 610 is configured to diffuse light 618 emitted by multiple illuminators 612. For example, the multiple illuminators 612 can be operable to emit respective different wavelengths of light.

In some implementations, imaging systems are configured to account for natural variation in how HMWs are worn. For different instances of an HMW being worn by a given user, the HMW will naturally rest in slightly different positions, sit at different angles, etc. For biometric authentication processes that attempt to match features of images (e.g., a newly-captured image compared to a reference/template image), this variation can make matching determinations less accurate, because images may be mis-aligned with one another. Accordingly, some implementations of this disclosure include hardware and/or software features that provide image registration (alignment) capabilities.

Figure 7A:
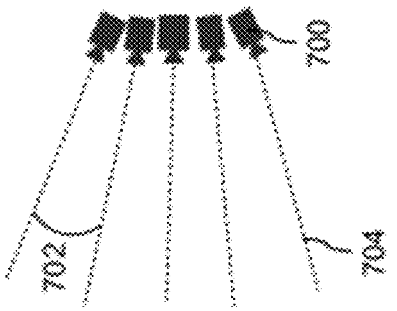
FIGS. 7A-7B are diagrams illustrating multi-imaging-angle imaging in accordance with an implementation.

In some implementations, as shown in FIG. 7A, an imaging system includes multiple imaging devices 700 (e.g., cameras) configured to image at different respective angles. For example, nearest angles can differ from one another (e.g., a difference represented by angle 702) by between 0.5° and 2° or between 0.5° and 5°. The angles can collectively span between 2° and 10°, between 2° and 15°, between 5° and 20°, or another angle range. The angles of the multiple image devices 700, as referenced herein, represent directions (e.g., direction 704) corresponding to the centers of fields of view of the imaging devices 700.

Figure 7B:
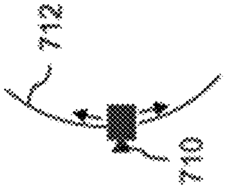

In some implementations, as shown in FIG. 7B, an imaging system includes an imaging device 710 (e.g., a camera) that is pivotable over a range 712 of imaging angles. For example, the imaging device 710 can be mounted on a pivotable hinge. For example, the range 712 can be between 2° and 10°, between 2° and 15°, between 5° and 20°, or another angle range.

The computing system 106 can be configured to obtain well-registered images using variable-angle imaging systems such as the multiple imaging devices 700 and/or the pivotable imaging device 710. For example, the computing system 106 can be configured to obtain multiple images at different respective imaging angles, such as by causing two or more of the multiple imaging devices 700 to capture images, and/or by pivoting the imaging device 710 and causing the imaging device 710 to capture an image at two or more different imaging angles along the pivot. The computing system 106 can then compare each of the multiple images to a reference image to determine which of the multiple images best aligns with the reference image. For example, the computing system 106 can calculate an alignment score between each of the multiple images and the reference image (e.g., based on pixel-wise intensities, edge detection and comparison, keypoint comparison, and/or another method) and select the image of the multiple images that has the highest alignment score. This image is then tested against the reference image in a biometric authentication process.

Figure 8A:
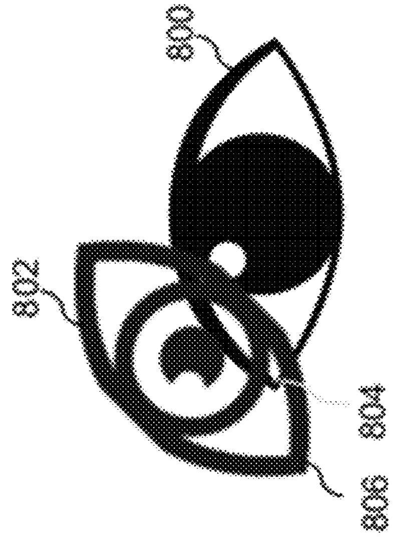
FIGS. 8A-8C are diagrams illustrating image alignment in accordance with an implementation.

For software-based image registration (which can be used on its own or, in some implementations, combined with hardware-based image registration as described above), some implementations are configured specifically for the facial fields of view imaged by inward-facing imaging devices of HMWs. These fields of view often include the eye and, accordingly, the eye can be used for image registration, such as between a newly captured image (or its digest in form of a verification template) and a reference image (or its digest in form of an enrollment template) corresponding to a user as whom a current user is attempting to authenticate. In some implementations, a corner of the eye can be used as an "anchor point" that aligns with a corner of the eye in other images. For example, as shown in FIG. 8A, a reference eye 800 is an image of an eye in a reference image, and a second eye 802 is an image of an eye in a newly-captured image being used for biometric authentication. The second eye 802 is misaligned with the reference eye 800 in both location (translation) and affine characteristics (e.g., alignment).

Figure 8B:
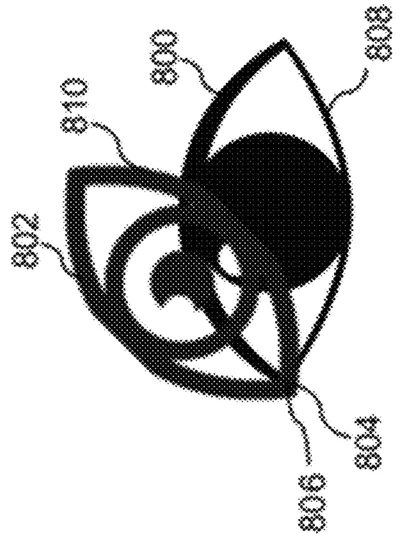

To use the eye corners 804, 806 of the eyes 800, 802 as anchor points, the eye corners 804, 806 are identified. For example, the computing system 106 or other computing system can input the images containing the eyes 800, 802 into a machine learning model (e.g., a CNN) that is trained to output locations of eye corners. As another example, local feature descriptors of the eyes 800, 802, such as histograms of gradients, SURF features, and/or edge/corner detection features) can be provided into one or more trained classifiers such as support vector machines, random forest models, decision trees, and/or CNNs, and the trained classifiers can locate the eye corners 804, 806 in the images. Once the eye corners 804, 806 have been identified, a computing system (e.g., computing system 106) aligns the eye corners 804, 806 with one another as shown in FIG. 8B.

Figure 8C:
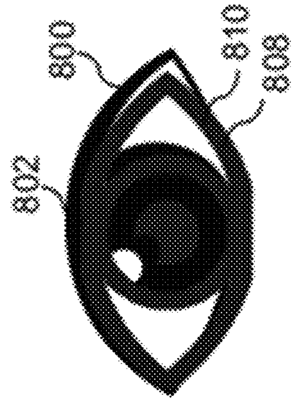

In some embodiments, in addition to or instead of alignment using anchor points for translational alignment, affine alignment is performed using one or more other features. For example, in some embodiments, affine alignment is performed using lower eyelids 808, 810. The lower eyelids 808, 810 are identified as described for location of the eye corner 804, 806, and an affine transformation, such as a rotation, that aligns the lower eyelids 808, 810 with one another, or that satisfies another similarity metric based on the lower eyelids 808, 810 (e.g., an affine transformation that causes the lower eyelids 808, 810 to have equal lengths) is determined. Lower eyelids can provide more stable reference points than upper eyelids, which move as the user blinks. As shown in FIG. 8C, from FIG. 8B, a clockwise rotation of eye 802, after alignment of anchor points, results in aligned eyes 800, 802. Alignment of the eyes 800, 802 can provide alignment of facial images including non-ocular facial regions. Accordingly, facial images or portions thereof can be used for biometric authentication after alignment using the eyes as described herein. For example, the newly-captured and aligned image can be compared against reference images to identify a match or lack of match.

Many HMWs include displays, and these displays can be used in conjunction with biometric. For example, the displays can include liquid crystal displays, light emitting diode displays, or quantum dot displays. One display can display images to both eyes, and/or two displays can display images to respective eyes. In some implementations, the displays provide graphical overlays on an external view, such as in AR headsets and AR smartglasses.

Figure 9A:
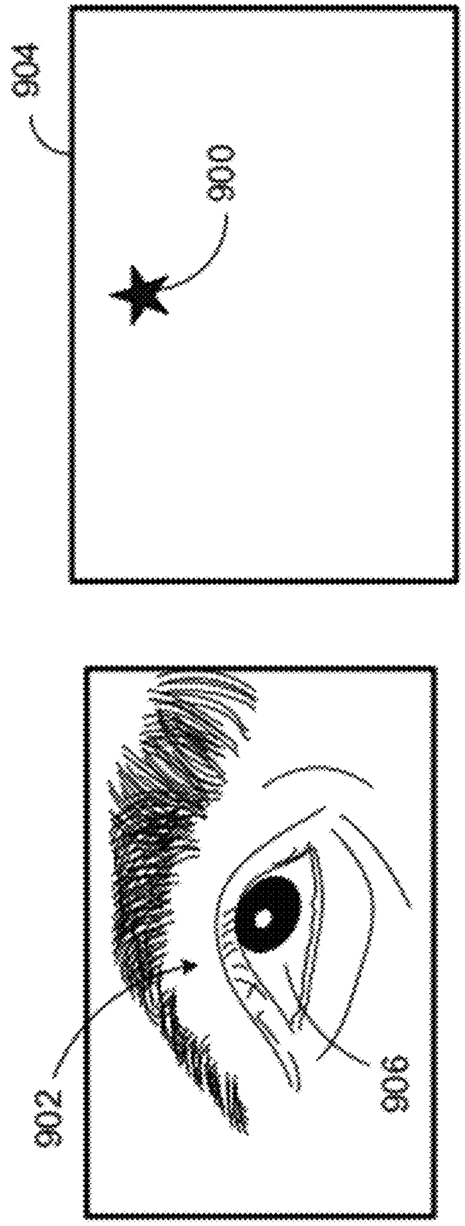
FIGS. 9A-9C are diagrams illustrating graphical fixation features in accordance with an implementation.

In some implementations, the computing unit 106 controls an inward-facing display (e.g., one or both displays 114) to display one or more graphical fixation feature that are configured to draw the gaze of the user and, in doing so, direct the gaze of the user to improve imaging for biometric authentication. The computing unit 106 can cause capture of one or more images as the gaze is directed in this manner. As shown in FIG. 9A, in some embodiments a graphical fixation feature 900 is displayed in a position to direct a gaze of an eye 902 upwards. For example, the graphical fixation feature 900 can be displayed in an upper half of a display 904 and/or above a level (e.g., an expected level) of the pupil of the eye 902. The graphical fixation feature 900 can be a point (e.g., a dark spot against a brighter background or a light spot against a darker background), an image (e.g., a star or another shape), or an interest point in a graphical display (e.g., an animated portion of a graphical display that tends to draw the eye compared to other portions of the graphical display). Drawing the gaze of the eye 902 upward tends to reduce upper eyelid image occlusions (e.g., due to drooping), for example, to expose more of the sclera and the surface vasculature on top of it 906 for imaging and biometric authentication.

Figure 9B:
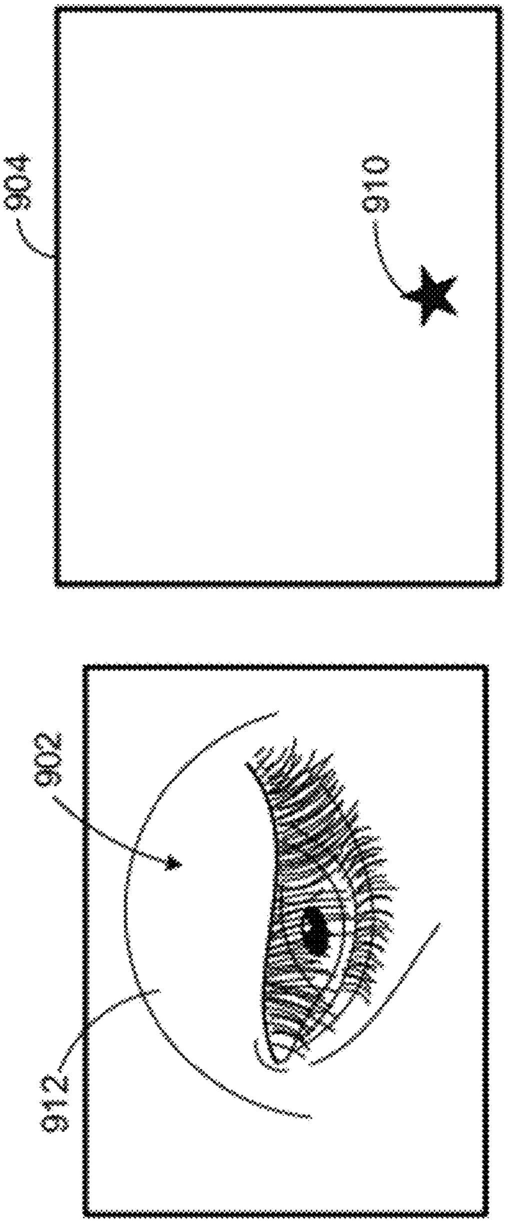

In some implementations, as shown in FIG. 9B, a graphical fixation feature 910 is displayed in a position to direct a gaze of the eye 902 downward. For example, the graphical fixation feature 910 can be displayed in a lower half of the display 904 and/or below a level (e.g., an expected level) of the pupil of the eye 902. Drawing the gaze downward can expose vasculature features of the eyelid 912 for imaging and subsequent use in biometric authentication.

In some implementations, a graphical fixation feature is displayed in a position to direct a gaze of the eye straight ahead. For example, the graphical fixation feature can be displayed directly ahead of and level with an expected position of the pupil.

Figure 9C:
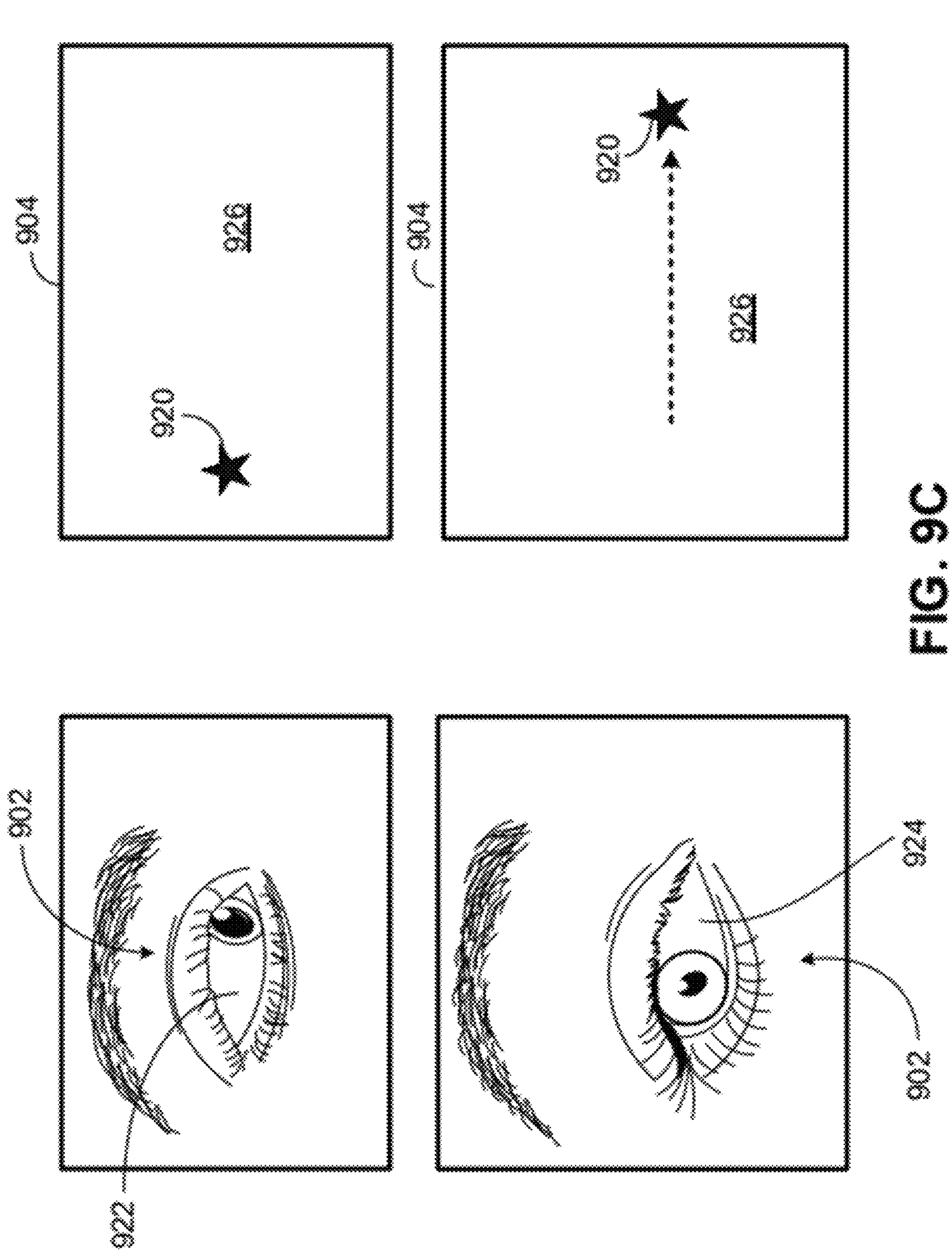

In some implementations, graphical fixation features are displayed in positions to direct a gaze left, right, or both left and right in succession. For example, as shown in FIG. 9C, a graphical fixation feature 920 is first displayed in a position to direct a gaze of the eye 902 to the left. For example, the graphical fixation feature 920 can be displayed in a right half of the display 904 facing the eye 902, and/or can be displayed to the right of a lateral position (e.g., an expected lateral position) of the pupil of the eye 902. Drawing the gaze to the left or right can expose respective right 922 and left 924 portions of the sclera, and the surface vasculature on top of it, for imaging and use in biometric authentication, allow for more complete capture of the biometric signature of a user and, accordingly, more accurate biometric authentication determinations. These portions 922, 924 of the sclera, in some implementations, may be hidden when the gaze is directed directly at the imaging device.

As further shown in FIG. 9C, the graphical fixation feature 920 can subsequently be displayed to draw the gaze of the eye 902 to the right, exposing the left portion 924 of the sclera and the surface vasculature on top of it for imaging. Movement of the graphical fixation feature 920 can be instantaneous ("teleportation") or can include animated movement of the graphical fixation feature 920 across the display.

In some implementations, drawing of the gaze in two or more directions can be used for anti-spoofing detection. A real human user will naturally track the graphical fixation feature to its multiple positions, whereas a spoof user (e.g., a video display of a user, or a prosthetic eye and/or face) may not be able to replicate this gaze changing accurately. Accordingly, in some implementations, the gaze can be tracked across images and/or video corresponding to two or more configurations (e.g., positions) of the graphical fixation feature (which can be randomized in some implementations), and movement of the gaze can be compared to an expected movement of the gaze corresponding to the two or more configurations of the graphical fixation feature. For example, a match score can be calculated, and a match score below a threshold value can indicate that the imaged subject is a spoof representation of a user. Examples of eye gaze tracking methodologies can be found in U.S. Pat. No. 9,939,893, the entirety of which is incorporated herein by reference.

Having the gaze be directed in a given direction (whether straight ahead, up/down, left/right, or another direction) for biometric image capture can also be useful because it can provide a more consistent eye configuration for imaging. For example, even if two eyes are aligned with one another (e.g., using an eye corner and lower eyelid), the eyeballs themselves may be unaligned, such as if the gazes of the eyes are directed in different directions. For example, different portions of the sclera may be exposed in different images. Capturing images under conditions of constant gaze direction (corresponding to similar or matching configurations of graphical fixation features) can reduce this variation/lack of alignment to provide more accurate and reliable matching determinations.

Figure 10:
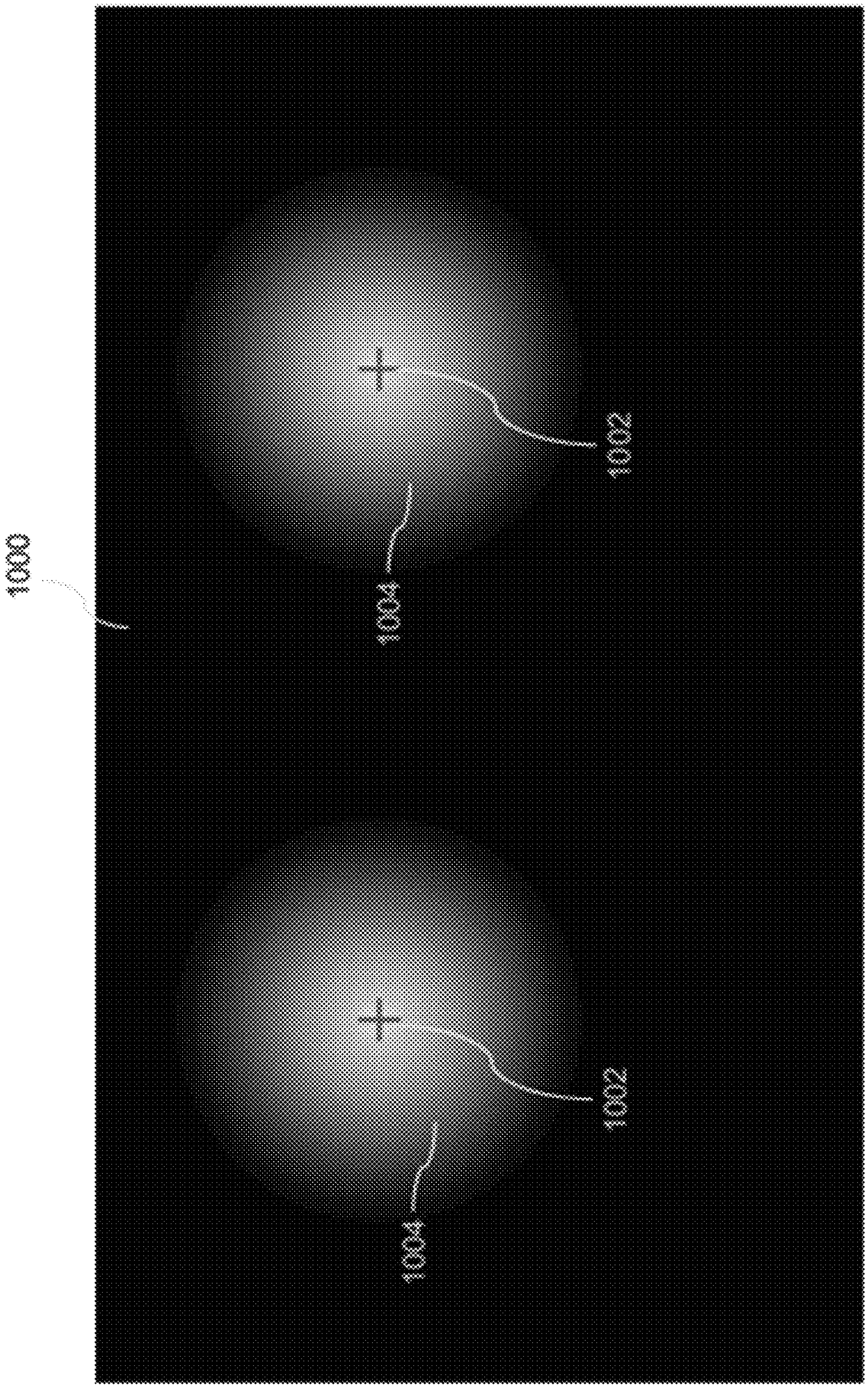
FIG. 10 is an example image showing graphical fixation features and an illuminating background in accordance with an implementation.

In some implementations, displays are used as light sources for imaging. For example, a background displayed behind a graphical fixation feature (e.g., background 926 in FIG. 9C) can act as a backlight to illuminate the user's face. In some implementations, the background is white. In some implementations, the background is green and/or blue (e.g., cyan), such as to provide improved imaging of surface vasculature. In some implementations, illuminating backgrounds include brightness gradients. For example, as shown in FIG. 10, a display 1000 is controlled to display two graphical fixation features 1002 that direct gazes of the left and right eyes. Around the graphical fixation features 1002, the display 1000 is controlled to display an illuminated background 1004 that dims radially from center points (in this example, the graphical fixation features 1002) to the peripheries of the display 1000. Having a gradient in the brightness of the illuminated background can reduce bright, glary patches that might otherwise reflect off the eye and/or skin of the user and occlude features used for biometric authentication.

In some implementations, an HMW includes one or more attachment sensors configured to detect whether the HMW is currently being worn be a user. For example, the attachment sensors can include tension sensors (e.g., integrated into one or more straps); galvanic skin resistance electrical contact sensors integrated into portion(s) of the HMW in contact with the face, such as pads of a headset or handles of smartglasses; and/or infrared proximity sensors. In some implementations, after a user has been authenticated (e.g., and been granted access to a secure system of the HMW), data from the attachment sensors is monitored (e.g., by the computing system 106) to determine whether the HMW is still being worn by the user. If it is determined that the HMW has been removed, the authenticated state of the HMW is terminated, and, when the HMW is subsequently re-worn, an additional authentication process is initiated to re-authenticate the user.

In some implementations, the computing system 106 is configured to implement a detection routine to determine whether views from one or more imaging systems are obscured, e.g., by fog/smudges on lenses or other components. For example, in some implementations, a 2D FFT of an image captured by the imaging system can be analyzed; high-frequency content of the 2D FFT below a threshold amount can be indicative of fog/smudges on one or more lenses of the imaging system. In some implementations, the computing system 106 is configured to analyze corneal reflections in a captured image to try to identify reflected graphical fixation features. For example, the graphical fixation feature, as displayed on a display, can have a shape, and the computing system 106 is configured to search for the shape in the reflections, e.g., using a method described above for identification of eye corners. If the shape is not found, the computing system 106 can determine that there is fog/smudges on the imaging system. If the shape is found, in some implementations the computing system 106 can calculate a 2D FFT of the image to determine whether the 2D FFT has high-frequency content below the threshold amount; if so, the computing system 106 can determine that is fog/smudges on the imaging system. In some implementations, a search for reflections of graphical fixation features can be performed to identify certain attacks such as spoof attacks, digital injections, and camera hijacks. In the case of a spoofed user, a digital injection of false data, or a camera hijack to present a false image, the spoofed user or false data will not correctly match real-time changes in the graphical fixation features, as indicated by corneal reflections. Accordingly, in some implementations, if the graphical fixation features are not detected, the computing system 106 can determine that an attack is in progress.

Figure 11:
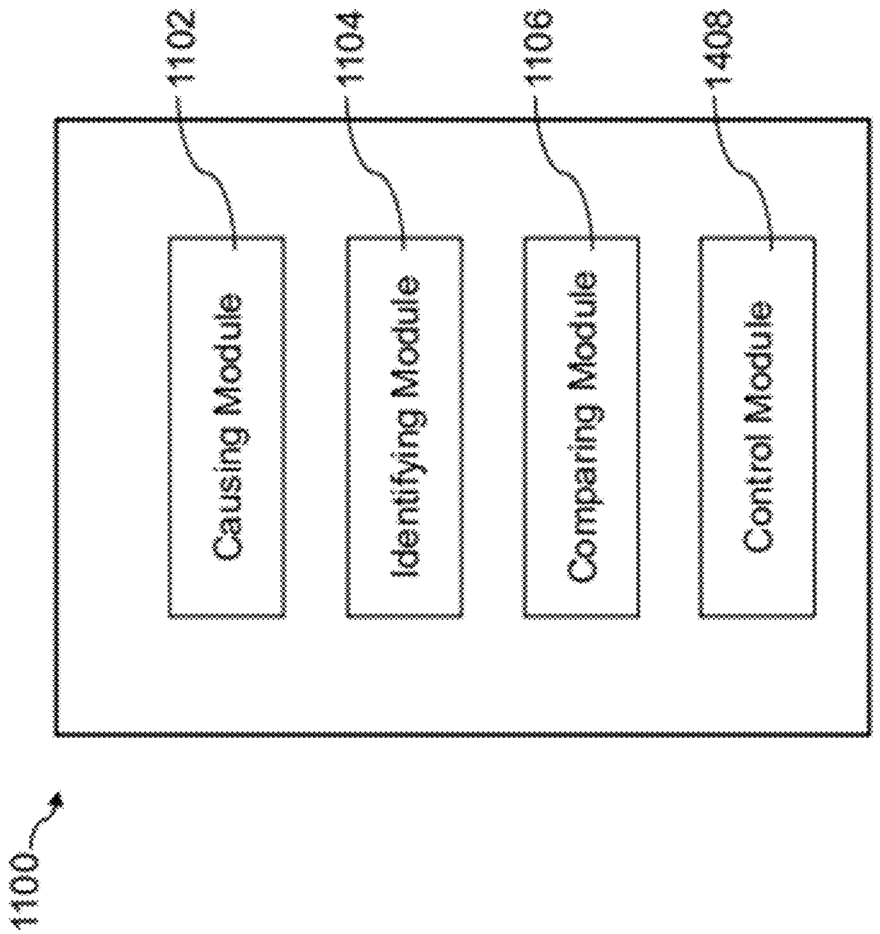
FIGS. 11-12 are diagrams illustrating example apparatuses that perform operations in accordance with an implementation.

FIG. 11 depicts examples of modules of an apparatus 1100 in accordance with one or more implementations of the present disclosure. The apparatus 1100 can be an example of an implementation of a system configured to perform biometric authentication. The apparatus 1100 can correspond to one or more of the implementations described above, and the apparatus 1100 includes the following. A causing module 1102 causes an inward-facing camera of a head-mounted wearable device to capture a first image of an eye region of a user. An identifying module 1104 identifies subdermal features in a non-ocular facial region of the user in the first image. A comparing module 1106 compares the identified subdermal features to corresponding subdermal features in a second image, to obtain a comparison result. A controlling module 1108 controls access to a secure system based on the comparison result.

In some implementations, comparing the identified subdermal features to corresponding features in the second image includes identifying at least one of a corner of an eye of the user in the first image, or a lower eyelid of the eye of the user in the first image; and aligning the first image with the second image using the at least one of the identified corner of the eye or the identified lower eyelid.

In some implementations, aligning the first image with the second image includes using the corner of the eye as an anchor point for alignment of the first image and the second image.

In some implementations, aligning the first image with the second image includes using the lower eyelid of the eye to determine an affine alignment between the first image and the second image. In some implementations, the affine alignment includes a rotation.

In some implementations, the subdermal features include subdermal vasculature.

In some implementations, causing the inward-facing camera to capture the first image includes causing the inward-facing camera to capture an infrared image.

In some implementations, the subdermal features are in at least one of a temporal region, a zygomatic region, or a buccal region.

Figure 12:
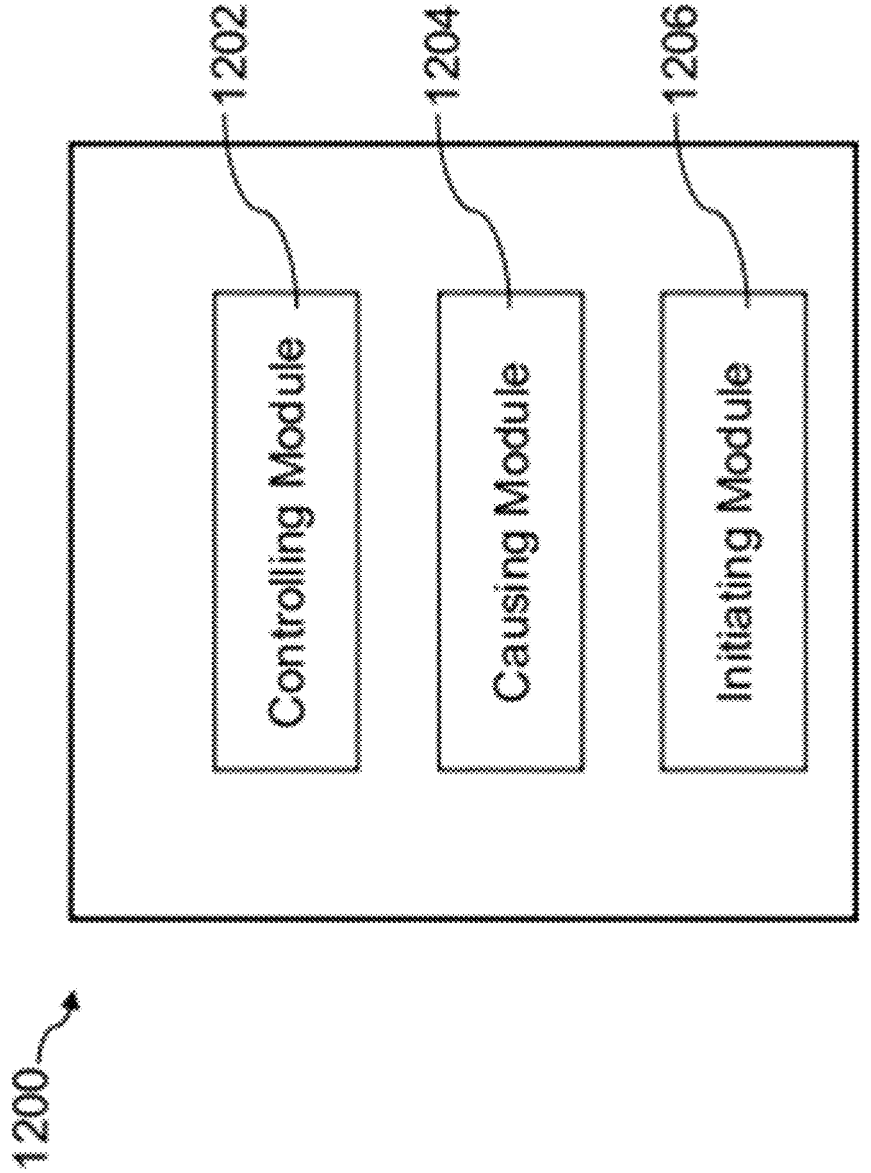

FIG. 12 depicts examples of modules of an apparatus 1200 in accordance with one or more implementations of the present disclosure. The apparatus 1200 can be an example of an implementation of a system configured to gaze direction for biometric authentication. The apparatus 1200 can correspond to one or more of the implementations described above, and the apparatus 1200 includes the following. A controlling module 1202 controls an inward-facing display of a head-mounted wearable device to display one or more graphical fixation features configured to direct a gaze of a user of the head-mounted wearable device. A causing module 1204 causes, during presentation of the one or more graphical fixation features, an inward-facing imaging device of the head-mounted wearable device to capture an image of an eye of the user. An initiating module 1206 initiates a biometric authentication process based on the image.

In some implementations, the one or more graphical fixation features are configured to direct the gaze of the user in an upward direction.

In some implementations, the one or more graphical fixation features are configured to direct the gaze of the user in a straight forward direction.

In some implementations, the one or more graphical fixation features include, displayed at a first time, a first graphical fixation feature configured to direct the gaze of the user to the right, and, displayed at a second time, a second graphical fixation feature configured to direct the gaze of the user to the left.

In some implementations, the biometric authentication process is based on features of ocular surface vasculature or pigmentations seen atop the sclera of the user in the image, and the one or more graphical fixation features are configured to cause exposure of more of the sclera than is displayed when the gaze of the user is directed directly at the imaging device.

In some implementations, the apparatus 1200 includes a second causing module that causes the inward-facing display to display an illuminating background behind the one or more graphical fixation features, the illuminating background configured to illuminate the eye of the user for imaging.

In some implementations, the illuminating background has a gradient of brightness. In some implementations, the brightness decreases radially from one or more central points. In some implementations, the illuminating background is white or cyan.

In one implementation, an HMW 100 may include additional features to generate biometric signals based on measuring the size of a user's facial features such as the width of a user's nose and the width of their head. For example, in one implementation, sensors are placed in the head-mounted wearable devices in adjustable nose pads to measure the width of a user's nose (e.g., the width of their nose bridge). For example, mechanical sensor could be placed in the nose pads to measure how the nose pads fit on the user's nose and from that a determination can be made of the user's nose-width at a key location, such as the nose bridge.

As another example, mechanical sensors in head-mounted wearable devices could measure a user's skull width at the ear loop. As one example, if a HMW 100 is mounted with head straps, the length of the strap could be measured using sensors. For example, referring to FIG. 1, a HMW includes a frame 108 configured to be mounted on a head of a user with straps positioned behind and/or over the user's ears. The strap position selected by the user could be monitored as an indication of their head size of the user at the ear loop. If the nose pad is adjustable, sensors in the nose pad may be used to measure the width of the user's nose.

As previously discussed, in some implementations, the one or more displays 114 are adjustable, e.g., to adjust a distance between two displays 114 to account for different eye-to-eye spacings in different users. This adjustable distance could also be measured as an additional source of information about the size of a user's face.

Biometric data on a user's nose width, head size, and/or eye separation may be stored and used, for example, as a soft biometric signal that, for example, provides a way to distinguish people with significantly different nose size, head size, or eye-to-eye separation. It provides an additional source of information for biometric authentication.

As previously discussed, the frame 108 may include one or more imaging systems 102 to image portions of a user's face under the head mounted device. The imaging devices of the imaging systems 102 can include, for example, digital cameras, 3D cameras, and/or light field sensors. In some implementations, this may include utilizing techniques to generate distance information and perform 3D scanning using visible light or infrared light (e.g., RGB and infrared light applied to depth sensors, time of flight sensors, structured-light scanning, etc.). In one implementation, at least one of the imaging systems 102 incorporates technology to perform partial three-dimensional imaging of a user's face to generate biometric measurement markers of points on the face of the user. This could include, for example, a partial three-dimensional scan of the face, such as a scan of the structure of the eyes, the nose, or both the eyes and the nose.

As another example, a variety of techniques could be used to estimate a user's arm length. There are a variety of hand and arm tracking techniques that may be used. This include tracking the user's hands from the HMW 100 and further extending such technique to measure the user's arm length. For example, outward facing cameras of the HMW 100 could monitor the user's hands and arms. Additionally, if other sources of information are available (e.g., hand tracking gloves, LIDAR, etc.) those sources of information could also be used and be used to calculate the length of the user's arms.

Many people also have an asymmetry between their right arm and their left arm. Some people have measurable differences between the length of each arm. The information on arm length and information on differences in arm length can be used to generate a soft biometric signal. Also, some people have a limited range of motion in both arms. Some people have asymmetries in their range of motion between each arm. The motion behavior of a user's arms could be captured by the HMW 100 as another source of soft biometric information.

In one implementation, the HMW 100 maps a user's cornea as a source of biometric information. As previously discussed, the computing unit 106 controls displays 114 and can display patterns on them. In one implementation, this is used to generate display images for corneal topography. Corneal topography maps the anterior curvature of the cornea. In corneal topography, the reflected patterns on the cornea are captured using special patterns displayed on the displays 114 of a user's headset, such as a grid, concentric circle, and a point cloud pattern. At least one of the imaging systems 102 monitors the reflected patterns from the user's corneas. These measurements can be conducted while the user gazes fixated at a reference point. For example, computer instructions for generating the display may be stored in a memory of the computing system 106 and executed by a processor to go through a routine of inviting the user to watch the display with their eyes gazing fixated at a reference point.

The corneal topographic map may have user-specific deformations and identifiable non-spherical attributes, such as a non-standard astigmatism. This can be used to generate user-specific identification information that is stored in a memory for future use in biometric identification of the user.

As another example, one or more of the imaging systems 102 may be replaced with high-resolution three-dimensional mapper to generate three-dimensional profile map of the iris. The three-dimensional profile map may be used to generate biometric information regarding three-dimensional aspects of the iris of a user that are unusual.

Yet another example, one or more of the imaging systems 102 may specialize in generating a high-resolution color profile of the iris to generate biometric information. For example, while there are general eye colors (e.g., brown, blue, green, etc.) at high-resolution there often may be variations in the shade of color across the iris. For example, the iris does just have a nominal color (e.g., green) but there are many different shades of color that form an overall pattern of color of the iris. A high-resolution color profile may be used to identify minor differences in shades of color (e.g., 5, 10, or 20 different shades of color, as an example). Differences is the average shade of color and in patterns of color may be determined and used as a biometric signal.

Figure 13:
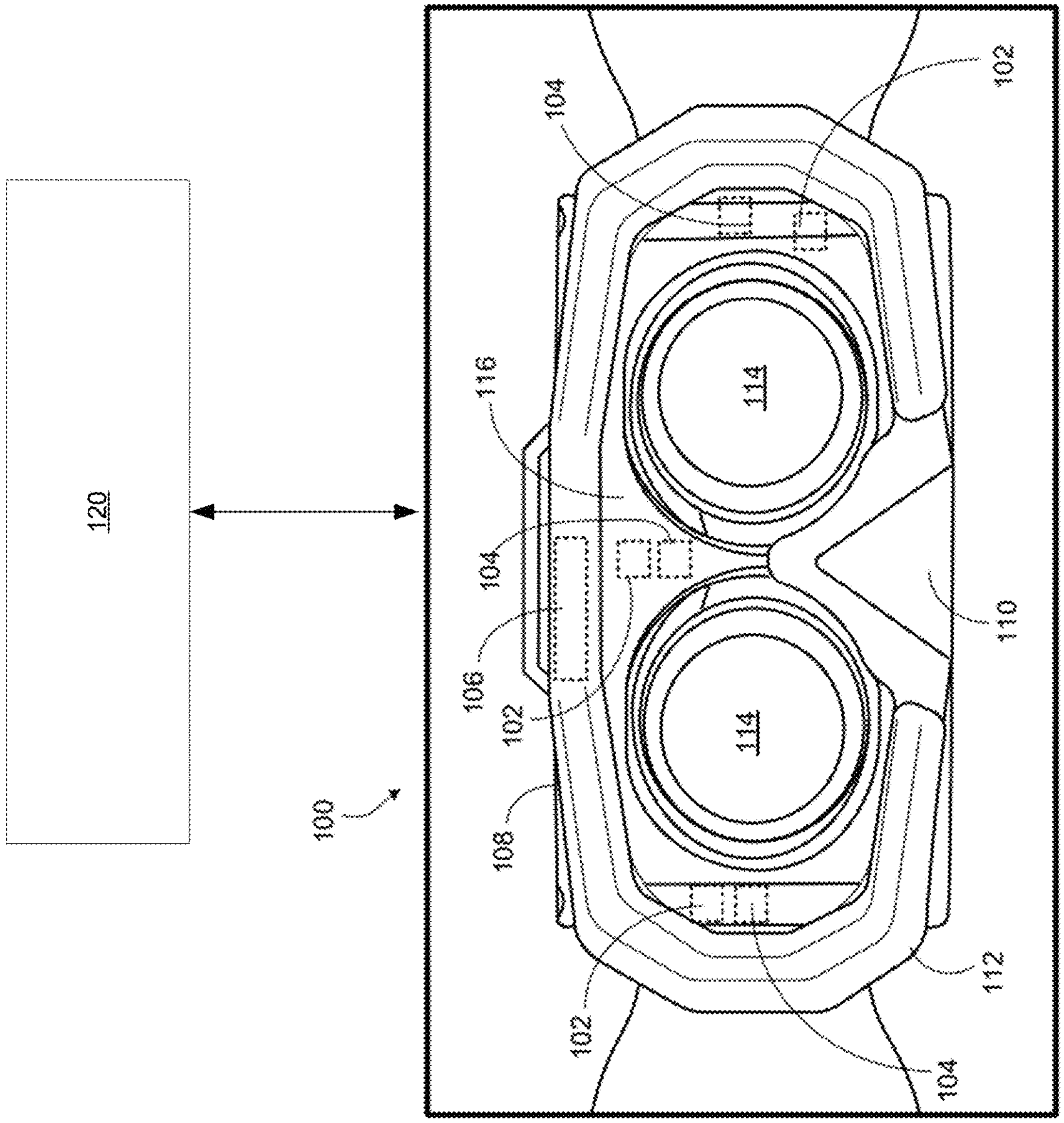
FIGS. 13-14 are diagrams illustrating implementation variations of the example of FIG. 1 in accordance with an implementation.
Figure 14:
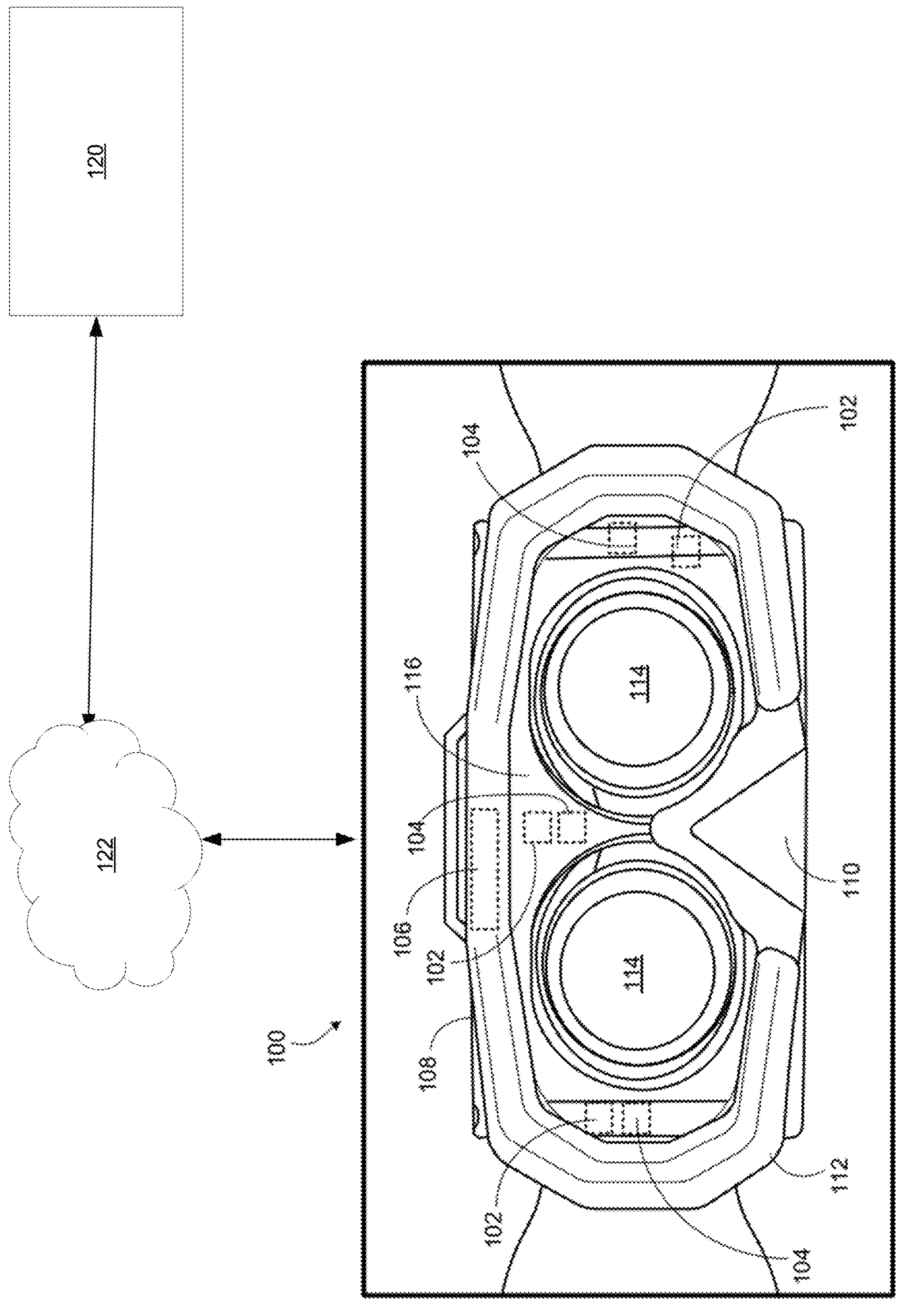

As previously discussed, biometric authentication processes/operations can be performed by the computing system 106, by a remote computing system communicatively coupled to the computing system 106, or by a combination thereof. Referring to FIG. 13, in some implementations a remote computing system 120 communicates with head-mounted display device via a network connection. The remote computing system 120 may also communicate with the head mounted display device via an internet connection 122. Alternatively, the remote computing system 120 may have at least some components implemented in the cloud.

OTHER EXAMPLES

The previously described examples of biometric authentication for head mounted wearable devices includes 1) virtual reality head mounted wearable devices and 2) augmented reality head mounted wearable devices. The biometric authentication may be implemented, for example, to authenticate a user in different contexts. This may include biometric authentication of the user as a condition to the user using accessing specific services, making purchases via the augmented reality/virtual reality head mounted wearable device, accessing confidential data, or accessing AR/VR programs.

Some additional examples are described below in Examples 1 to 55.

Example 1. A head-mounted wearable device, comprising:
- a frame mountable on a head of a user;
- an infrared imaging device arranged to image a face of the user when the frame is mounted on the head of the user; and
- a computing system configured to perform operations comprising:
  - causing the infrared imaging device to capture an image of the face of the user using infrared light received at the infrared imaging device; and
  - initiating a biometric authentication process based on the image.

Example 2. The head-mounted wearable device of Example 1, comprising an infrared illuminator arranged to illuminate the face of the user with infrared light.

Example 3. The head-mounted wearable device of Example 2, wherein the infrared illuminator comprises a diffuser configured to diffuse infrared light emitted by the infrared illuminator.

Example 4. The head-mounted wearable device of Example 1, comprising a visible-light imaging device arranged to image the face of the user when the frame is mounted on the head of the user.

Example 5. The head-mounted wearable device of Example 4, comprising a visible-light illuminator arranged to illuminate the face of the user with visible light.

Example 6. The head-mounted wearable device of Example 4, wherein the operations comprise:
- causing the visible-light imaging device to capture a second image of the face of the user using visible light received at the visible-light imaging device, wherein the biometric authentication process is further based on the second image.

Example 7. The head-mounted wearable device of Example 6, wherein the biometric authentication process is based on ocular surface vasculature features in the second image.

Example 8. The head-mounted wearable device of Example 1, wherein the biometric authentication process is based on subdermal vasculature features in the image.

Example 9. The head-mounted wearable device of Example 1, wherein the biometric authentication process is based on skin texture features in the image.

Example 10. A computer-implemented method comprising:
- causing an inward-facing infrared imaging device of a head-mounted wearable device to capture an image of a face of a user wearing the head-mounted wearable device; and
- initiating a biometric authentication process based on the image.

Example 11. The computer-implemented method of Example 10, comprising:
- causing an inward-facing infrared illuminator to illuminate the face of the user with infrared light.

Example 12. The computer-implemented method of Example 11, wherein the infrared illuminator comprises a diffuser configured to diffuse infrared light emitted by the infrared illuminator.

Example 13. The computer-implemented method of Example 10, comprising:
- causing an inward-facing visible-light imaging device to capture a second image of the face of the user, wherein the biometric authentication process is further based on the second image.

Example 14. The computer-implemented method of Example 13, comprising causing an inward-facing visible-light illuminator to illuminate the face of the user with visible light.

Example 15. The computer-implemented method of Example 13, wherein the biometric authentication process is based on ocular surface vasculature features in the second image.

Example 16. The computer-implemented method of Example 10, wherein the biometric authentication process is based on subdermal vasculature features in the image.

Example 17. The computer-implemented method of Example 10, wherein the biometric authentication process is based on skin texture features in the image.

Example 18. A non-transitory, computer-readable storage medium storing one or more instructions that, when executed by a computer system, cause the computer system to perform operations comprising:

causing an inward-facing infrared imaging device of a head-mounted wearable device to capture an image of a face of a user wearing the head-mounted wearable device; and initiating a biometric authentication process based on the image.

Example 19. The non-transitory, computer-readable storage medium of Example 18, wherein the biometric authentication process is based on subdermal vasculature features in the image.

Example 20. The non-transitory, computer-readable storage medium of Example 18, wherein the biometric authentication process is based on skin texture features in the image.

Example 21. A head-mounted wearable device, comprising:

a frame mountable on a head of a user;

an imaging system arranged to image a face of the user from a lateral imaging angle of at least 45° when the frame is mounted on the head of the user; and a computing system configured to perform operations comprising:

causing the imaging system to capture an image of the face of the user; and initiating a biometric authentication process based on the image.

Example 22. The head-mounted wearable device of Example 21, wherein the imaging system is arranged to image the face from a vertical imaging angle of at least 10° when the frame is mounted on the head of the user.

Example 23. The head-mounted wearable device of Example 21, wherein the lateral imaging angle is at least 65°.

Example 24. The head-mounted wearable device of Example 21, wherein the lateral imaging angle is less than 85°.

Example 25. The head-mounted wearable device of Example 21, wherein the biometric authentication process is based on a non-ocular facial region of the user in the image.

Example 26. The head-mounted wearable device of Example 25, wherein the biometric authentication process is based on subdermal vasculature features of the non-ocular facial region of the user in the image.

Example 27. The head-mounted wearable device of Example 21, comprising a second camera arranged to image the user when the frame is mounted on the head of the user, the second camera having a different field of view from a field of view of the camera.

Example 28. The head-mounted wearable device of Example 21, wherein the biometric authentication process is based on the patterns seen over the sclera of the user in the image.

Example 29. A head-mounted wearable device, comprising:

a frame mountable on a head of a user;

an imaging system comprising one or more cameras arranged to image a face of the user when the frame is mounted on the head of the user; and a computing system configured to perform operations comprising:

causing the imaging system to capture a first image of the face, the first image focused at a first distance from the imaging system;

causing the imaging system to capture a second image of the face, the second image focused at a second distance from the imaging system; and initiating a biometric authentication process based on at least one of the first image or the second image.

Example 30. The head-mounted wearable device of Example 29, wherein the operations comprise:

determining a first focus quality metric of the first image and a second focus quality metric of the second image; and selecting one of the first image or the second image to use in the biometric authentication process based on the first focus quality metric and the second focus quality metric.

Example 31. The head-mounted wearable device of Example 29, wherein the operations comprise:

identifying a first in-focus portion of the first image;

identifying a second in-focus portion of the second image; and initiating the biometric authentication process based on the first in-focus portion of the first image and the second in-focus portion of the second image.

Example 32. The head-mounted wearable device of Example 29, wherein the imaging system comprises:

a first camera focused at the first distance; and a second camera focused at the second distance.

Example 33. The head-mounted device of Example 32, wherein the first camera is configured to image at least one of an in-focus nasal region, an in-focus portion of a periocular region adjacent to the nasal region, or an in-focus portion of an infraorbital region adjacent to the nasal region when the frame is mounted on the head of the user, and wherein the second camera is configured to image at least one of an in-focus eye, an in-focus temporal region, or an in-focus zygomatic region of the user when the frame is mounted on the head of the user.

Example 34. The head-mounted wearable device of Example 29, wherein the imaging system comprises:

a camera; and a focusing mechanism adjustable by the computing system to configure two or more focus distances of the camera.

Example 35. The head-mounted wearable device of Example 29, wherein the biometric authentication process is based on the first image and the second image.

Example 36. A biometric authentication method, comprising:

causing an inward-facing camera of a head-mounted wearable device to capture a first image of an eye region of a user;

identifying subdermal features in a non-ocular facial region of the user in the first image;

comparing the identified subdermal features to corresponding subdermal features in a second image, to obtain a comparison result; and based on the comparison result, controlling access to a secure system.

Example 37. The biometric authentication method of Example 36, wherein comparing the identified subdermal features to corresponding features in the second image comprises:

identifying at least one of a corner of an eye of the user in the first image, or a lower eyelid of the eye of the user in the first image; and aligning the first image with the second image using at least one of the identified corners of the eye or the identified lower eyelid.

Example 38. The biometric authentication method of Example 37, wherein aligning the first image with the second image comprises: using the corner of the eye as an anchor point for alignment of the first image and the second image.

Example 39. The biometric authentication method of Example 37, wherein aligning the first image with the second image comprises: using the lower eyelid of the eye to determine an affine alignment between the first image and the second image.

Example 40. The biometric authentication method of Example 39, wherein the affine alignment comprises a rotation.

Example 41. The biometric authentication method of Example 36, wherein the subdermal features comprise subdermal vasculature.

Example 42. The biometric authentication method of Example 36, wherein causing the inward-facing camera to capture the first image comprises causing the inward-facing camera to capture an infrared image.

Example 43. The biometric authentication method of Example 36, wherein the subdermal features are in at least one of a temporal region, a zygomatic region, or a buccal region.

Example 44. A biometric authentication method, comprising:

controlling an inward-facing display of a head-mounted wearable device to display one or more graphical fixation features configured to direct a gaze of a user of the head-mounted wearable device;

during presentation of the one or more graphical fixation features, causing an inward-facing imaging device of the head-mounted wearable device to capture an image of an eye of the user; and initiating a biometric authentication process based on the image.

Example 45. The biometric authentication method of Example 44, wherein the one or more graphical fixation features are configured to direct the gaze of the user in an upward direction.

Example 46. The biometric authentication method of Example 44, wherein the one or more graphical fixation features are configured to direct the gaze of the user in a straight forward direction.

Example 47. The biometric authentication process of Example 44, wherein the one or more graphical fixation features comprise displayed at a first time, a first graphical fixation feature configured to direct the gaze of the user to the right, and displayed at a second time, a second graphical fixation feature configured to direct the gaze of the user to the left.

Example 48. The biometric authentication method of Example 44, wherein the biometric authentication process is based on features of ocular surface vasculature seen atop the sclera of the user in the image, and wherein the one or more graphical fixation features are configured to cause exposure of more of the sclera than is displayed when the gaze of the user is directed directly at the imaging device.

Example 49. The biometric authentication process of Example 44, comprising causing the inward-facing display to display an illuminating background behind the one or more graphical fixation features, the illuminating background configured to illuminate the eye of the user for imaging.

Example 50. The biometric authentication process of Example 49, wherein the illuminating background has a gradient of brightness.

Example 51. The biometric authentication process of Example 50, wherein the brightness decreases radially from one or more central points.

Example 52. The biometric authentication process of Example 49, wherein the illuminating background is white or cyan.

Example 53. Any of the previous examples of authentication using the head mounted wearable device, wherein the biometric authentication process is based on an iris color shade measurement.

Example 54. Any of the previous examples of authentication using the head mounted wearable device, wherein the biometric authentication process is based on a partial three-dimensional scan of points on a user's face.

Example 54. Any of the previous examples of authentication using the head mounted wearable device, wherein the biometric authentication includes generating a display image, monitoring an ocular reflection of the displayed image, generating a corneal topographic map, and using the corneal topographic map for biometric authentication.

Example 55, any of the previous examples of method of authentication using the head mounted wearable device, further comprising performing a measurement of arm length, wherein the biometric authentication is based at least in part on the measurement of arm length.

Example 55, Any of the previous examples of authentication using the head mounted wearable device, further comprising performing a mechanical measurement of a portion of a user's head, wherein the biometric authentication is based at least in part on the measurement.

Examples 1 to 55 may be practiced with head mounted wearable devices that include virtual reality head mounted wearable devices and augmented reality head mounted wearable devices. The biometric authentication may be implemented, for example, to authenticate a user during use of the augmented reality/virtual reality head mounted wearable device.

Various implementations of the systems, techniques, processes, and operations described here, such as the computing system 106 and remote computing systems, modules (e.g., modules that perform or that are configured to perform various operations), and operations described as being performed by computing systems, can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions.

To provide for interaction with a user, the systems and techniques described here can be implemented on a computer or wearable device having one or more display devices (e.g., a CRT (cathode ray tube), LCD (liquid crystal display), or LED (light emitting diode) display) for displaying information to the user and one or more interactive devices, such as keyboards, wearable-device mounted buttons/trackpads, and/or hand-operated joysticks/controllers by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input. Imaging devices, as described above, can be included to image the user (e.g., as inward-facing cameras in a head-mounted wearable device) and/or an environment of the user. Illuminators, as described above, can be include to illuminate a face of the user. Display(s), feedback device(s), interactive device(s), imaging device(s), and illuminator(s) can be coupled to processors, e.g., by a bus coupled to memory/storage. One or more power devices, such as batteries, can provide power to power other components of the system (e.g., the computing system 106 and associated imaging devices, illuminators, and displays of the head-mounted wearable device).

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A biometric authentication method, comprising:

controlling an inward-facing display of a head-mounted wearable device to display one or more graphical fixation features displayed in a portion of the display selected to direct a gaze of a user of the head-mounted wearable device in a pre-selected direction to cause exposure of a pre-selected region of an eye scanned to capture a biometric signature of the pre-selected region wherein the pre-selected region of the eye is at least partially hidden when the gaze is directed directly at an inward-facing imaging device of the head-mounted wearable device, wherein the one or more graphical fixation features are selected from the group consisting of a dark spot, a light spot, an image having a pre-selected shape, and an animation;

tracking a user's gaze across two or more positions of the one or more graphical fixation features;

comparing the user's gaze to an expected movement of the gaze corresponding to the two or more positions of the one or more graphical fixation features;

generating a match score;

detecting spoofing if the match score is below a threshold value;

during presentation of the one or more graphical fixation features, causing the inward-facing imaging device of the head-mounted wearable device to capture an image of the pre-selected region of the eye of the user for biometric authentication with the pre-selected direction of the user's gaze controlled by the portion of the display the one or more graphical fixation features are displayed;

and initiating a biometric authentication process based on the captured image.

2. The biometric authentication method of claim 1, wherein the head-mounted wearable device comprises one member from the group consisting of an augmented reality headset and a virtual reality headset.

3. The biometric authentication method of claim 1, wherein the one or more graphical fixation features are displayed in an upper portion of the display to draw the gaze of a user upward to reduce upper eyelid image occlusions and expose more of the sclera and surface vasculature for imaging and biometric authentication.

4. The biometric authentication method of claim 1, wherein the one or more graphical fixation features are displayed in a lower portion of the display to draw the gaze of a user downward to expose vasculature features of an eyelid for imaging and biometric authentication.

5. The biometric authentication method of claim 1, wherein the one or more graphical fixation features are displayed on a right portion of the display to draw the gaze of a user to expose a left portion of the sclera and associated surface vascularization for imaging and biometric authentication.

6. The biometric authentication method of claim 1, wherein the one or more graphical fixation features are displayed on a left portion of the display to draw the gaze of a user to expose a right portion of the sclera and associated surface vascularization for imaging and biometric authentication.

7. The biometric authentication method of claim 1, further, comprising:

searching for corneal reflections of the one or more graphical fixation features in the captured image; and identifying a spoofing attack in response to determining that the corneal reflections do not match the one or more graphical fixation features presented to the user.

8. The biometric authentication method of claim 1, wherein the biometric authentication process is based on ocular surface vasculature features in the captured image.

9. The biometric authentication method of claim 1, wherein the biometric authentication process is based on subdermal vascular features in the captured image.

10. The biometric authentication method of claim 1, further comprising analyzing at least one biometric signature associated with measuring a physical size of one or more facial features of the user as an additional form of biometric authentication.

11. A head-mounted wearable device, comprising:

a processor; and a memory storing instructions that when executed by the processor configure the head-mounted wearable device to:

control an inward-facing display of a head-mounted wearable device to display one or more graphical fixation features displayed in a portion of the display selected to direct a gaze of a user of the head-mounted wearable device in a pre-selected direction to cause exposure of a pre-selected region of an eye scanned to capture a biometric signature of the pre-selected region wherein the pre-selected region of the eye is at least partially hidden when the gaze is directed directly at an inward-facing imaging device of the head-mounted wearable device, wherein the one or more graphical fixation features are selected from the group consisting of a dark spot, a light spot, an image having a pre-selected shape, and an animation;

track a user's gaze across two or more positions of the one or more graphical fixation features;

comparing the user's gaze to an expected movement of the gaze corresponding to the two or more positions of the one or more graphical fixation features;

generate a match score;

detect spoofing if the match score is below a threshold value;

during presentation of the one or more graphical fixation features, cause the inward-facing imaging device of the head-mounted wearable device to capture an image of the pre-selected region of the eye of the user for biometric authentication with the pre-selected direction of the user's gaze controlled by the portion of the display the one or more graphical fixation features are displayed;

and initiate a biometric authentication process based on the captured image.

12. The head-mounted wearable device of claim 11, wherein the head-mounted wearable device comprises one member from the group consisting of an augmented reality headset and a virtual reality headset.

13. The head-mounted wearable device of claim 11, wherein the one or more graphical fixation features are displayed in an upper portion of the display to draw the gaze of a user upward to reduce upper eyelid image occlusions and expose more of the sclera and surface vasculature for imaging and biometric authentication.

14. The head-mounted wearable device of claim 11, wherein the one or more graphical fixation features are displayed in a lower portion of the display to draw the gaze of a user downward to expose vasculature features of an eyelid for imaging and biometric authentication.

15. The head-mounted wearable device of claim 11, wherein the one or more graphical fixation features are displayed on a right portion of the display to draw the gaze to the right to expose a left portion of the sclera and associated surface vascularization for imaging and biometric authentication.

16. The head-mounted wearable device of claim 11, wherein the one or more graphical fixation features are displayed on a left portion of the display to draw the gaze of the user to expose a right portion of the sclera and associated surface vascularization for imaging and biometric authentication.

17. The head-mounted wearable device of claim 11, wherein the head-mounted wearable device is configured to:

identify a spoofing attack in response to determining that the corneal reflections do not match the one or more graphical fixation features presented to the user.

18. The head-mounted wearable device of claim 11, wherein the biometric authentication process is based on ocular surface vasculature features in the captured image.

19. The head-mounted wearable device of claim 11, wherein the biometric authentication process is based on subdermal vascular features in the captured image.

20. A computer program product residing on a non-transitory computer readable medium having a plurality of instruction stored thereon, which, when executed by a processor, cause the processor to perform operations comprising:

controlling an inward-facing display of a head-mounted wearable device to display one or more graphical fixation features displayed in a portion of the display selected to direct a gaze of a user of the head-mounted wearable device in a pre-selected direction to cause exposure of a pre-selected region of an eye scanned to capture a biometric signature of the pre-selected region wherein the pre-selected region of the eye is at least partially hidden when the gaze is directed directly at an inward-facing imaging device of the head-mounted wearable device, wherein the one or more graphical fixation features are selected from the group consisting of a dark spot, a light spot, an image having a pre-selected shape, and an animation;

tracking a user's gaze across two or more positions of the one or more graphical fixation features;

comparing the user's gaze to an expected movement of the gaze corresponding to the two or more positions of the one or more graphical fixation features;

generating a match score;

detecting spoofing if the match score is below a threshold value;

during presentation of the one or more graphical fixation features, causing the inward-facing imaging device of the head-mounted wearable device to capture an image of the pre-selected region of the eye of the user for biometric authentication with the pre-selected direction of the user's gaze controlled by the portion of the display the one or more graphical fixation features are displayed;

and initiating a biometric authentication process based on the captured image.

* * * * *